(12) United States Patent
Wakabayashi et al.

(10) Patent No.: US 9,196,286 B2
(45) Date of Patent: Nov. 24, 2015

(54) OPTICAL DISK INFORMATION DEVICE AND INFORMATION PROCESSING DEVICE

(71) Applicant: Panasonic Intellectual Property Management Co., Ltd., Osaka (JP)

(72) Inventors: Kanji Wakabayashi, Kyoto (JP); Kousei Sano, Osaka (JP); Yoshiaki Komma, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/403,248

(22) PCT Filed: May 30, 2013

(86) PCT No.: PCT/JP2013/003430
§ 371 (c)(1),
(2) Date: Nov. 24, 2014

(87) PCT Pub. No.: WO2013/179673
PCT Pub. Date: Dec. 5, 2013

(65) Prior Publication Data
US 2015/0138942 A1     May 21, 2015

(30) Foreign Application Priority Data

May 31, 2012    (JP) ................................ 2012-124679

(51) Int. Cl.
*G11B 7/09*         (2006.01)
*G11B 7/007*      (2006.01)
(Continued)

(52) U.S. Cl.
CPC ............ *G11B 7/00718* (2013.01); *G11B 7/094* (2013.01); *G11B 7/0941* (2013.01);
(Continued)

(58) Field of Classification Search
None
See application file for complete search history.

(56) References Cited

U.S. PATENT DOCUMENTS

| | | |
|---|---|---|
| 5,347,504 A | 9/1994 | Ito et al. |
| 5,430,701 A | 7/1995 | Ito et al. |

(Continued)

FOREIGN PATENT DOCUMENTS

| | | |
|---|---|---|
| JP | 05-242512 | 9/1993 |
| JP | 06-068473 | 3/1994 |
| JP | 2000-315322 | 11/2000 |
| JP | 2001-189019 | 7/2001 |
| JP | 2001-256652 | 9/2001 |

OTHER PUBLICATIONS

International Search Report issued Jun. 25, 2013 in International (PCT) Application No. PCT/JP2013/003430.

*Primary Examiner* — Wayne Young
*Assistant Examiner* — Brian Butcher
(74) *Attorney, Agent, or Firm* — Wenderoth, Lind & Ponack, L.L.P.

(57) ABSTRACT

An optical disk information device includes a laser light source that emits a luminous flux with a wavelength λ, an objective lens having a numerical aperture NA, a splitting element, a photodetector, a central portion amplifier, at least two end portion amplifiers, an adder, a control signal processing section having a tracking switcher that inverts a polarity of a tracking control signal depending on whether a track scanned by a condensing spot corresponds to a land portion or a groove portion, and a gain controller that, when the polarity of the tracking control signal is inverted, switches gains of the central portion amplifier and the end portion amplifiers and sets the gain of the central portion amplifier substantially lower than the gain of at least one of the end portion amplifiers so as to reduce crosstalk from adjacent tracks in the optical disk.

10 Claims, 21 Drawing Sheets

(51) Int. Cl.
  *G11B 7/095* (2006.01)
  *G11B 7/1353* (2012.01)
  *G11B 20/10* (2006.01)
  *G11B 7/1381* (2012.01)
(52) U.S. Cl.
  CPC ............ *G11B 7/0956* (2013.01); *G11B 7/1353* (2013.01); *G11B 20/10027* (2013.01); *G11B 20/10212* (2013.01); *G11B 7/0901* (2013.01); *G11B 7/1381* (2013.01); *G11B 2007/00709* (2013.01)

(56) References Cited

U.S. PATENT DOCUMENTS

| | | |
|---|---|---|
| 5,440,536 A | 8/1995 | Ito et al. |
| 6,809,999 B1 | 10/2004 | Kim et al. |
| 2001/0036133 A1 | 11/2001 | Nagata et al. |
| 2009/0046549 A1* | 2/2009 | Takazawa et al. .......... 369/44.32 |
| 2011/0222384 A1* | 9/2011 | Kondo et al. ................ 369/53.2 |

* cited by examiner

OPTICAL DISK INFORMATION DEVICE AND INFORMATION PROCESSING DEVICE

TECHNICAL FIELD

The present invention relates to an optical disk information device that reproduces and/or records information from and/or on an optical disk and to an information processing device such as a computer, server, an optical disk player, and an optical disk recorder which uses the optical disk information device.

BACKGROUND ART

CDs (Compact Discs), DVDs (Digital Versatile Discs), and BDs (Blu-ray (registered trademark) Discs) are commonly and generally known as conventional optical disks. In recent years, there has been a demand to further increase recording density. To allow implementation of an optical disk information device that enables high-density recording and reproduction, a reduction in the track pitch of optical disks or an increase in linear density is needed.

As described above, the track pitch of optical disks is effectively reduced in order to increase the recording density of the optical disk information device.

However, the reduced track pitch disadvantageously increases the amount of crosstalk in which signals recorded in tracks adjacent to a scanned track are added to a reproduction signal, leading to noise.

Thus, to solve this problem, some conventional optical disk information devices include a one-beam optical system that cancels crosstalk by performing an arithmetic correction on outputs from three areas into which a light receiving element is divided in a direction orthogonal to tracks as described in Patent Literature 1; the arithmetic correction is expressed by $S=K \cdot C+R+L$ (K is a constant) where a central signal is denoted by C, a right signal is denoted by R, and a left signal is denoted by L.

However, in the conventional configuration, that is, the optical disk information device in Patent Literature 1, when the track pitch is increasingly reduced in order to improve the recording density, tracking error signals may fail to be obtained due to a diffraction limit. That is, the reduced track pitch also reduces the groove pitch of guide grooves forming the tracks. When the groove pitch decreases below the diffraction limit ($=\lambda/(2 \cdot NA)$, where NA denotes numerical aperture), the amount of light returning to an objective lens stops changing, precluding tracking error signals from being retrieved from the guide grooves. Furthermore, even when the groove pitch is larger than the diffraction limit, a small difference between the groove pitch and the diffraction limit leads to a very small change in the amount of return light. This also prevents sufficient tracking error signals from being obtained.

For example, conditions for simulations and experiments described in FIG. 9 in Patent Literature 1 include a wavelength of 780 nm, an objective lens NA of 0.5, and a track pitch Tp of 0.8 μm. Under these conditions, the diffraction limit for light beams is 0.78 μm, and the track pitch is approximately equal to the diffraction limit. Thus, crosstalk is reduced but tracking error signals are not obtained, precluding information signals from being reproduced.

To allow sufficient tracking error signals to be obtained without affecting reproduction of information signals, the track pitch Tp needs to satisfy the following formula.

$$Tp > 1.2 \cdot (\text{diffraction limit}) = 1.2 \cdot (\lambda/(2 \cdot NA))$$

However, for example, BDs, currently commercially available high-density optical disks, have a wavelength of about 0.405 μm, an objective lens NA of 0.85, and a track pitch of 0.32 μm. When it is assumed that the density is farther increased by reducing, the track pitch, then Tp>0.29 μm. The resultant scale factor of the increase in density is about 1.2, and thus, the effect is insignificant. Furthermore, due to the degree of the reduction in track pitch Tp, the amount of increase in crosstalk is small, and the effect of the introduction of the crosstalk canceller is very insignificant.

Therefore, in areas in which a substantially significant crosstalk cancel effect is exerted, sufficient tracking error signals are not obtained. The conventional configuration is thus inconsistent with the increase in density, which is the original object.

CITATION LIST

Patent Literature 1: Japanese Unexamined Patent Publication No. H5-242512

SUMMARY OF INVENTION

The present invention is intended to solve the conventional problems. An object of the present invention is to provide an optical disk information device that can reduce crosstalk using a system that provides practical tracking error signals, increasing the recording density in a track direction.

An aspect of the present invention provides an optical disk information device that reproduces and/or records information from and/or on an optical disk having groove-shaped tracks and allowing information to be recorded on land portions and groove portions of the grooves, the optical disk information device having a laser light source that emits a luminous flux with a wavelength λ, an objective lens having a numerical aperture NA and condensing the luminous flux emitted by the laser light source to form a condensing spot on the optical disk, a splitting element having a central portion area and at least two end portion areas between which the central portion area is sandwiched to split reflected light that is reflected and diffracted by the optical disk into a luminous flux corresponding to the central portion area and luminous fluxes corresponding to the end portion areas, a photodetector having a central portion light receiving section that receives the luminous flux from the central portion area and at least two end portion light receiving sections that receive the luminous fluxes from the end portion areas, to output light amount signals corresponding to amounts of light in the received luminous fluxes, a central portion amplifier that receives the light amount signal from the central portion light receiving section and amplifies the light amount signal by a predetermined gain to output a central portion amplified signal, at least two end portion amplifiers that receive the light amount signals from the end portion light receiving sections and amplify the light amount signals by a predetermined gain to output end portion amplified signals a gain controller that controls the gains of the central portion amplifier and the end portion amplifiers, an adder that adds the central portion amplified signal from the central portion amplifier and the end portion amplified signals from the end portion amplifiers together and outputs an information signal, a reproduction signal processing section that processes the information signal and outputs a reproduction signal, and a control signal processing section that receives the reflected light that is reflected and diffracted by the optical disk to produce a focusing control signal and a tracking control signal, wherein the control signal processing section includes a tracking switcher that inverts a polarity of the tracking control signal depending on whether a track scanned by the condensing spot corresponds to the land portion or the groove portion, and when the polarity of the tracking control signal is inverted the gain controller switches the gains of the central portion amplifier and the end portion amplifiers and sets the gain of the central portion amplifier substantially lower than the gain of at least one of the end portion amplifiers so as to reduce crosstalk from adjacent tracks in the optical disk, and when a groove pitch in the optical disk is denoted by Gp, $(Gp/2)<(1.2\cdot\lambda)/(2\cdot NA)$ is satisfied.

The present configuration can provide an optical disk information device that can reduce crosstalk using a system that provides practical tracking error signals, increasing the recording density in a track direction.

DESCRIPTION OF EMBODIMENTS

Embodiments of the present invention will be described below with reference to the Drawings.

Embodiment 1

Figure 1:
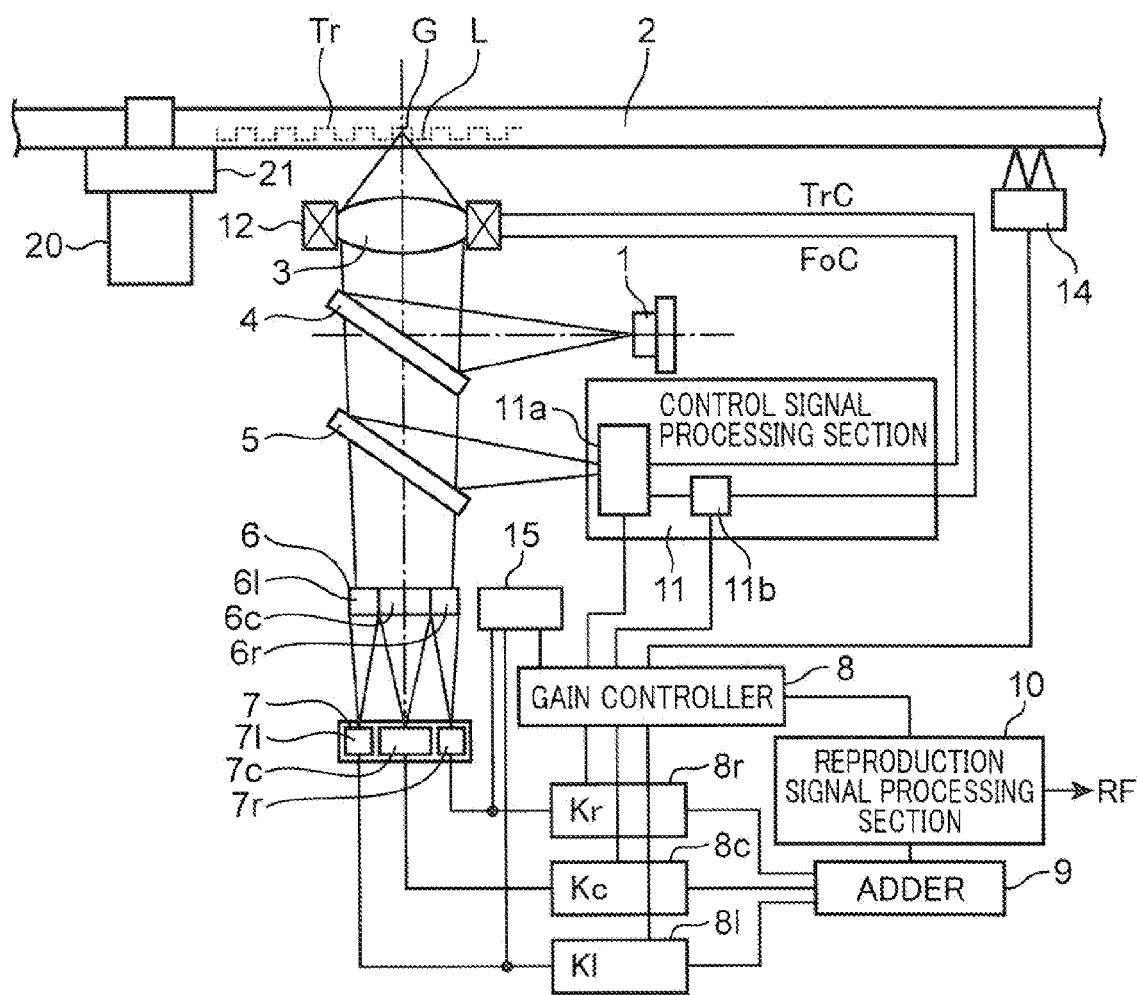
FIG. 1 is a schematic diagram depicting a configuration of an optical disk information device according to Embodiment 1 of the present invention.
Figure 2:
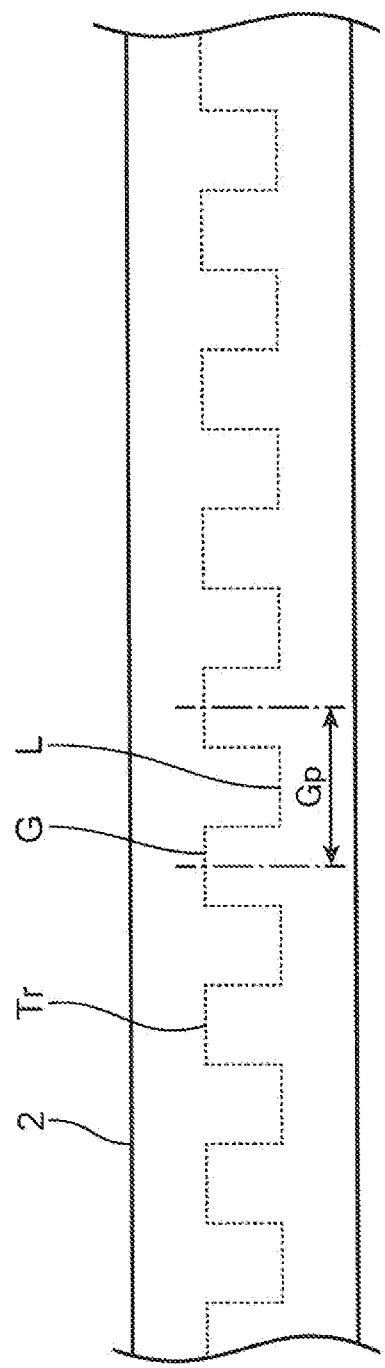
FIG. 2 is a schematic diagram depicting a groove structure in an optical disk used for the optical disk information device according to Embodiment 1 of the present invention.
Figure 3:
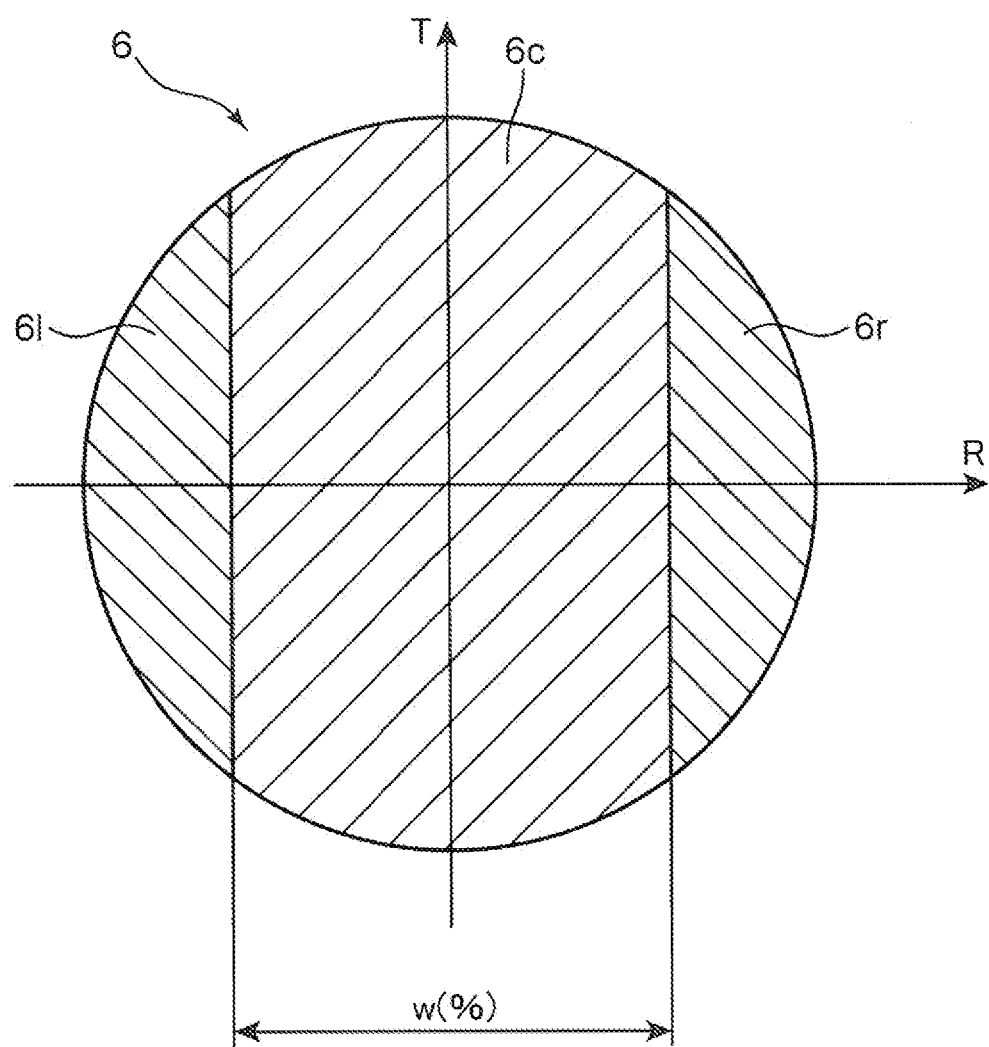
FIG. 3 is a schematic diagram depicting a division configuration of a splitting element in the optical disk information device according to Embodiment 1 of the present invention.

FIG. 1 is a schematic diagram depicting a configuration of an optical disk information device according to Embodiment 1 of the present invention. FIG. 2 is a schematic diagram depicting a groove structure in an optical disk used for the optical disk information device according to Embodiment 1 of the present invention. FIG. 3 is a schematic diagram depicting a division configuration of a splitting element in the optical disk information device according to Embodiment 1 of the present invention.

In FIG. 1, the optical disk information device includes a blue semiconductor laser unit 1, an objective lens 3, a laser mirror 4, a beam splitter 5, a splitting element 6, a photodetector 7, a gain controller 8, amplifiers 8c, 8r, and 8l, an adder 9, a reproduction signal processing section 10, a control signal processing section 11, an objective lens actuator 12, a tilt detector 14, a lens shift detector 15, a spindle motor 20, and a turntable 21. The control signal processing section 11 includes a control signal generation section 11a and a tracking switcher 11b. The splitting element 6 has a central portion area 6c and two end portion areas 6r and 6l. The photodetector 7 has three light receiving sections 7c, 7r, and 7l.

Furthermore, the splitting element 6, the photodetector 7, the gain controller 8, the amplifiers 8c, 8r, and 8l, the adder 9, and like provides a crosstalk canceller that cancels crosstalk from adjacent tracks in the optical disk 2. The configurations of the gain controller and the amplifiers are not particularly limited to the illustrated example. For example, a gain variable amplification circuit may be used which includes a gain controller and at least three amplifiers.

The blue semiconductor laser unit 1 is a laser light source that emits a luminous flux with a wavelength λ. The wavelength λ of light emitted by the blue semiconductor laser unit 1 is between 400 nm and 415 nm. For example, in Embodiment 1, the blue semiconductor laser unit 1 is configured to emit light beams (luminous fluxes) with a wavelength of approximately 405 nm.

The optical disk 2 is installed on a turntable 21. The turntable 21 is rotated by the spindle motor 20 to rotate the optical disk 2. Furthermore, as depicted in FIG. 2, the optical disk 2 has groove-shaped tracks Tr, and information can be recorded on land portions L and groove portions G of the grooves. When groove pitch is denoted by Gp, the following formula is satisfied.

$$(Gp/2) < (1.2 \cdot \lambda)/(2 \cdot NA)$$

In Embodiment 1, for example, the groove pitch Gp=0.48 μm, and Gp/2, that is, the track pitch Tp=0.24 μm. Gp/2 is smaller than $(1.2 \cdot \lambda)/(2 \cdot NA) = (1.2 \times 0.405)/(2 \times 0.85) = 0.286$ μm.

Referring back to FIG. 1, the objective lens 3 has a numerical aperture NA and condenses a luminous flux emitted by the blue semiconductor laser unit 1 to form a condensing spot on the optical disk 2. For example, in Embodiment 1, the objective lens 3 is configured to condense a light beam with a wavelength of about 405 nm at a numerical aperture NA of 0.85.

In this regard, the track pitch Tp of the optical disk 2 is 0.24 μm and is smaller than the track pitch of BDs, which is 0.32 μm. Thus, the recording density is expected to be increased by a factor of 1.8.

The light beam emitted by the blue semiconductor laser unit 1 is reflected by the laser mirror 4 and travels toward the objective lens 3. The blue light beam is focused by the objective lens 3 and then condensed on and delivered to, for example, a groove portion G (or a land portion L) on an information recording surface of the optical disk 2.

The light is reflected and diffracted by the information recording surface of the optical disk 2 into reflected light. The reflected light passes through the objective lens 3 as in the case of the forward path and then through the laser mirror 4 and a beam splitter 5 and to the splitting element 6. The splitting element 6 is a diffraction element with fine grooves formed on a glass surface so as to operate as a diffraction grating.

As depicted in FIG. 3, the splitting element 6 is shaped like, for example, a disk, and is divided into three areas along a direction corresponding to a radial direction R of the optical disk 2 (the direction orthogonal to a tangential direction T of the optical disk 2), that is, the central portion area 6c and the two end portion areas 6r and 6l between which the central portion area 6c is sandwiched. The light beam having passed through these areas is separated into light beams traveling in different directions by means of the diffraction gratings in the respective areas. In Embodiment 1, for example, the width w of the central portion area 6c of the splitting element 6 in the radial direction R is 70% of the diameter of the light beam.

Subsequently, the separated light beams enter three different light receiving sections 7c, 7r, and 7l of the photodetector 7. That is, the light beam having passed through the central portion area 6c enters the light receiving section 7c (central portion light receiving section) of the photodetector 7. The light beam having passed through the end portion area 6r enters the light receiving section 7r (end portion light receiving section). The light beam having passed through the end portion area 6l enters the light receiving section 7l (end portion light receiving section).

The photodetector 7 outputs light amount signals corresponding to the amounts of light received by the light receiving sections 7c, 7r, and 7l, respectively. The light amount signals enter the amplifier 8c (central portion amplifier) and the amplifiers 8r and 8l (end portion amplifiers), respectively. The amplifiers 8c, 8r, and 8l are gain variable amplifiers that allow gain to be varied. The gain controller 8 controls the gains of the amplifiers 8c, 8r, and 8l. That is, the gains of the amplifiers 8c, 8r, and 8l are set equal to optimum gains Kc, Kr, and Kl by the gain controller 8. The light amount signals are amplified by the optimum gains Kc, Kr, and Kl, and the amplified signals are input to the adder 9.

The adder 9 adds the light amount signals resulting from the amplification by the optimum gains Kc, Kr, and Kl together and outputs an information signal. The reproduction signal processing section 10 processes the information signal and outputs a reproduction signal RF. As a result, the information signal output by the adder 9 contains suppressed crosstalk from the adjacent tracks and involves a reduced error rate, allowing the reproduction signal processing section 10 to reproduce an accurate reproduction signal RF.

Furthermore, the reproduction signal processing section 10 generates an evaluation value for the reproduction signal RF to supply the evaluation value to the gain controller 8. In Embodiment 1, for example, iMLSE (Integrated-Maximum Likelihood Sequence Estimation) is generated as the evaluation value. The iMLSE is used as an evaluation index for the quality of a binarized reproduction signal and is an evaluation value for error rate correlation.

The gain controller 8 controls the gains Kc, Kr, and Kl of the amplifiers 8e, 8r, and 8l using the iMLSE as an index, in order to optimize a coefficient for the crosstalk canceller. Specifically, the gain controller 8 determines the values of the gains Kc, Kr, and Kl so as to minimize the value of the iMLSE generated by the reproduction signal processing section 10. For example, the gain controller 8 repeats calculating, the value of the iMLSE with the values of the gains Kc, Kr, and Kl varied and selects the values of the gains Kc, Kr, and Kl that minimize the value of the iMLSE.

In this regard, the effect of crosstalk cancellation is determined by the ratio between the gains Kc, Kr, and Kl applied to the amplifiers 8c, 8r, and 8l, respectively. Thus, for simplification of calculations, the gain controller 8 determines the values of the gains Kr and Kl with the gain Kc set to 1. The values of the gains Kc, Kr, and Kl are effective when given as DC values. However, the values of the gains Kc, Kr, and Kl are more effective when given as tap coefficients for a digital filter with a frequency characteristic.

On the other hand, the control signal generation section 11a of the control signal processing section 11 receives the light beam reflected by the beam splitter 5 to detect a focusing error signal and a tracking error signal and generates a focusing control signal FoC and a tracking control signal TrC from the focusing error signal and the tracking error signal, respectively. The focusing control signal FoC and the tracking control signal TrC are output to the objective lens actuator 12, which performs a focusing operation and a tracking operation on the objective lens 3. In Embodiment 1, the track pitch Tp is 0.24 µm, which is smaller than the diffraction limit for light beams. However, the groove pitch Gp is 0.48 µm, providing a tracking error signal with a sufficient amplitude.

The control signal processing section 11 includes the tracking switcher 11b, which outputs the tracking control signal TrC generated by the control signal generation section 11a to the gain controller 8, in this regard, the tracking switcher 11b inverts the polarity of the tracking control signal TrC depending on whether a track scanned by the condensing spot corresponds to the land portion L or the groove portion G of the optical disk 2.

Furthermore, the gain controller 8 obtains, from the tracking switcher 11b, timing information on switching of the polarity of the tracking control signal and information allowing determination of whether the track scanned by the condensing spot corresponds to the land portion L or the groove portion G. This enables the combination of the gains set for the amplifiers 8c, 8r, and 8l to be switched in conjunction with switching between the land portion L and the groove portion G. Specifically, when the polarity of the tracking control signal is inverted, the gain controller 8 switches the gains of the amplifiers 8c, 8r, and 8l and sets the gain of the amplifier Sc substantially lower than the gain of at least one of the amplifiers 8l and 8r so as to reduce crosstalk from the adjacent tracks in the optical disk 2.

Thus, although the land portion L and the groove portion G differ in reflectance, Embodiment 1 prevents a situation where the relation between the scanned track and the adjacent tracks is inverted depending on whether the scanned track corresponds to the land portion L or the groove portion G, disabling the effects of the crosstalk canceller. Embodiment 1 can thus suppress leakage of signals from the adjacent tracks into the scanned track to reduce error rate, allowing accurate recording and reproduction of information signals to be achieved.

Figure 4:
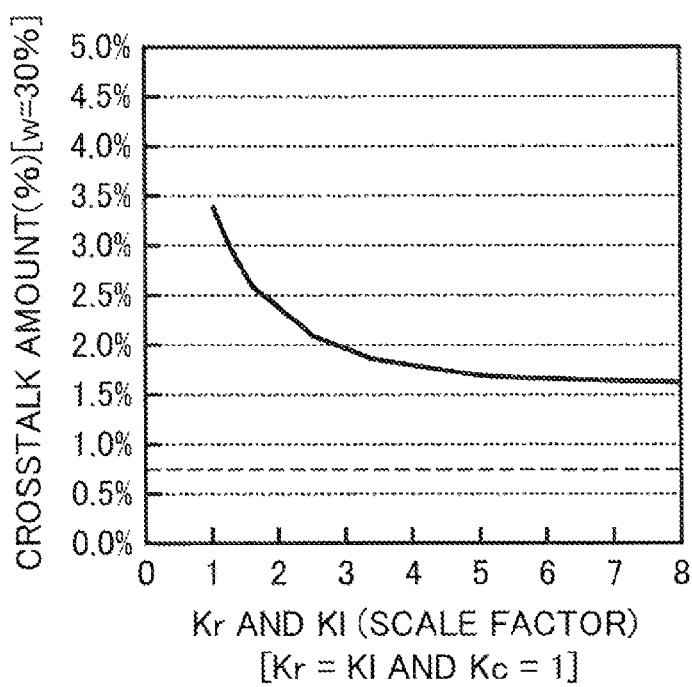
FIG. 4 is a diagram depicting results of calculations of the amount of crosstalk obtained when a central portion area of the optical disk information device according to Embodiment 1 of the present invention has a width of 30%.
Figure 5:
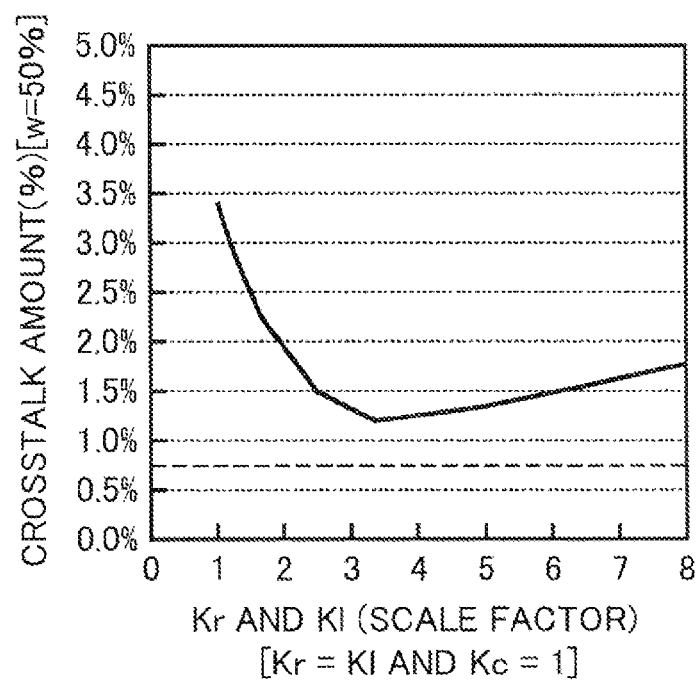
FIG. 5 is a diagram depicting results of calculations of the amount of crosstalk obtained when the central portion area of the optical disk information device according to Embodiment 1 of the present invention has a width of 50%.
Figure 6:
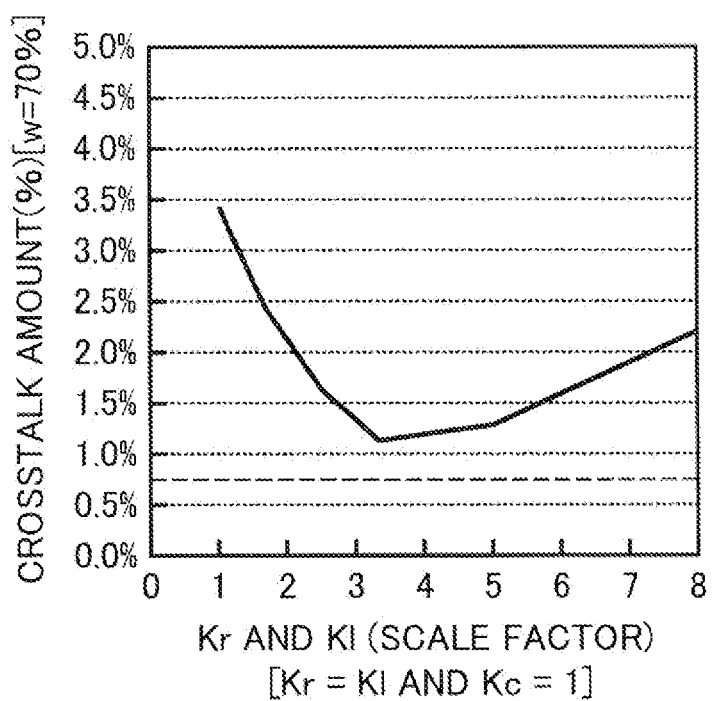
FIG. 6 is a diagram depicting results of calculations of the amount of crosstalk obtained when the central portion area of the optical disk information device according to Embodiment 1 of the present invention has a width of 70%.

FIGS. 4 to 6 are diagrams depicting results of calculations of the amount of crosstalk made by the optical disk information device according to Embodiment 1 of the present invention. FIG. 4 depicts a case where the central portion area 6c has a width w of 30%. FIG. 5 depicts a case where the central portion area 6c has a width w of 50%. FIG. 6 depicts a case where the central portion area be has a width w of 70%. In each case, the axis of ordinate indicates the amount of crosstalk. When the amplitude of the reproduction signal is denoted by S which is obtained when the scanned track is provided with an 8T signal in accordance with BD standard, and the standard deviation of crosstalk signals provided to the scanned track is denoted by Sc which is observed when six tracks disposed on opposite sides of and adjacent to the scanned track are provided with a 2T signal, a 3T signal, a 4T signal, and an 8T signal in accordance with BD standard in a random sequence, the amount of crosstalk is defined to be Sc/S(%).

Furthermore, the axis of abscissas indicates scale factors for the gains Kr and Kl provided by the amplifiers 8r and 8l, respectively, when the gain Kc provided by the amplifier 8c under the control of the gain controller 8 is 1. In this case, Kr=Kl.

When similar calculations are performed under conditions for BDs, that is, when the amount of crosstalk is calculated for Tp=0.32 µm, λ=0.405 µm, and NA 0.85 with no crosstalk canceller applied, the amount of crosstalk is 0.74%, which is depicted by a dash line in FIGS. 4 to 6.

Furthermore, when the scale factor for the gains Kr and Kl is 1, the effects of the crosstalk canceller are disabled, and the amount of crosstalk is 3.4%. In contrast, selecting the optimum value for the scale factor for the gains Kr and Kl enables a reduction in the amount of crosstalk to 1.2% when the central portion area 6c has a width w of 50% and to 1.1% when the central portion area 6c has a width w of 70%. This means a sufficient crosstalk cancellation effect.

As described above, in FIGS. 4 to 6, the axis of ordinate indicates the amount of crosstalk and thus corresponds to evaluation of the effect cancelling only the crosstalk. However, the actual reproduction signal contains, besides crosstalk noise, media noise, laser noise, and amplifier noise caused by the amplifiers 8c, 8r, and 8l. In particular, the amplifier noise from the amplifiers 8r and 8l is increased by factors of Kr and Kl, respectively. The level of the amplifier noise disadvantageously increases as the areas of the end portion areas 6r and 6l become smaller, that is, the area of the central portion area 6c becomes larger.

Figure 7:
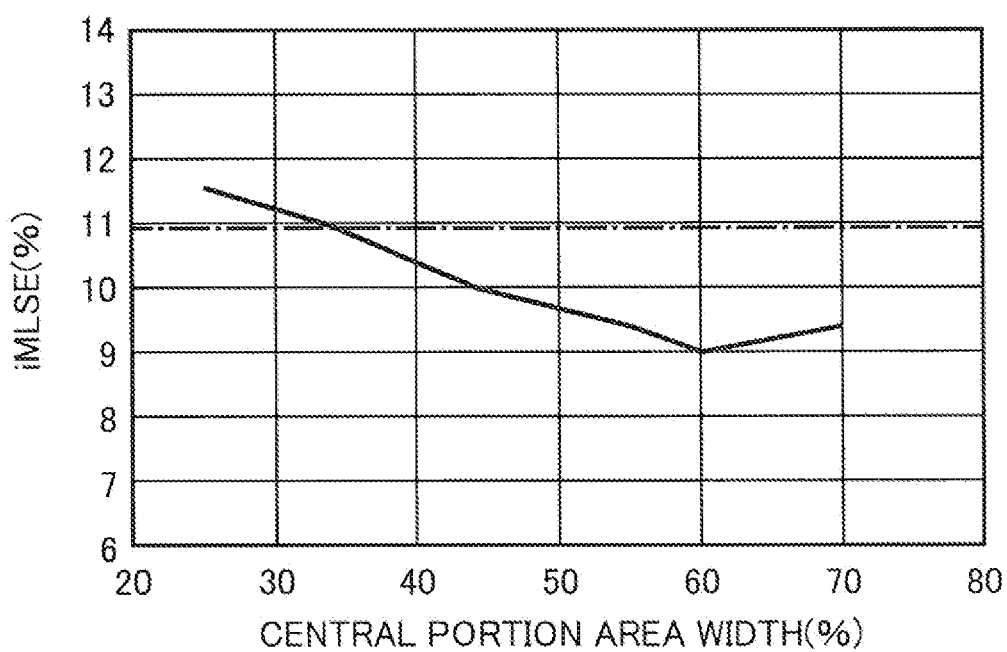
FIG. 7 is a diagram depicting results of calculations of iMLSE taking into account various types of noise with respect to the width of central portion area of the optical disk information device according to Embodiment 1 of the present invention.

FIG. 7 is a diagram depicting results of calculations of the iMLSE taking into account the various types of noise with respect to the width w of the central portion area 6c. In FIG. 7, the value of the iMLSE with respect to the width w of the central portion area 6c is determined with the gain Kc set to 1 and the optimum gains Kl and Kr provided.

When a similar calculation is performed under the conditions for BDs, that is, when the iMLSE is calculated for Tp=0.32 µm, λ=0.405 µm, and NA=0.85 with no crosstalk canceller applied, the value of the iMLSE is 11.0%, which is depicted by a dash line in FIG. 7.

In contrast, according to Embodiment 1, the conditions are such that Tp=0.24 µm, λ=0.405 µm, and NA=0.85 and a crosstalk canceller is applied. Then, the value of the iMLSE decreases until the width w of the central portion area 6c reaches 60%, whereas the value of the iMLSE increases as the width w increases above 60%, degrading the quality of the reproduction signal as depicted in FIG. 7. Thus, the use of the crosstalk canceller enables the value of the iMLSE to be set smaller than in the case of BDs when the width w of the central portion area 6c is between 35% and 70%.

In Embodiment 1, the width w of the central portion area 6c is 70%. However, as seen in FIG. 7, the quality of reproduction signals can be increased to a sufficiently high level as long as the width w of the central portion area 6c is 35% or more. That is, the width w of the central portion area 6c of the splitting element 6 in the radial direction R is preferably 35% or more and more preferably 50% or more of the width of a luminous flux. On the other hand, when the central portion area 6c becomes larger and the end portion areas 6r and 6l become excessively smaller, the amplifier noise is disadvantageously enhanced. Thus, the width w of the central portion area 6c of the splitting element 6 in the radial direction R is preferably 70% or less.

The above-described range allows the crosstalk from the adjacent tracks in the optical disk 2 to be sufficiently reduced and also allows the quality of reproduction signals to be increased to a sufficiently high level. For the above-described width of a luminous flux (the diameter of a light beam), for example, the diameter of the opening portion of an aperture (not depicted in the drawings) disposed between the objective lens 3 and the laser mirror 4 can be used as a reference.

Now, a case will be described where the optical disk 2 is inclined and thus tilted with respect to the optical axis of the objective lens 3.

When the optical disk 2 is inclined and thus tilted with respect to the optical axis of the objective lens 3, the amount of the tilt is detected by the tilt detector 14. The value of the amount is provided to the gain controller 8, which then sets the optimum gains Kc, Kr, and Kl for the amplifiers 8c, 8r, and 8l in accordance with the tilt amount. Light amount signals are amplified by the optimum gains Kc, Kr, and Kl, and the amplified signals are input to the adder 9. As a result, the adder 9 outputs an information signal containing suppressed crosstalk from the adjacent tracks and involving a reduced error rate. The reproduction signal processing section 10 can thus reproduce an accurate reproduction signal RF.

The tilt detector 14 may be, for example, a reflective photoreflector. Alternatively, a focusing operation may be preliminarily preformed at a predetermined radial position to estimate the tilt of the optical disk 2 from the focus offset amount of the objective lens actuator 12. This method allows the functions of the tilt detector 14 to be achieved without the need to add components such as a sensor.

Figure 8:
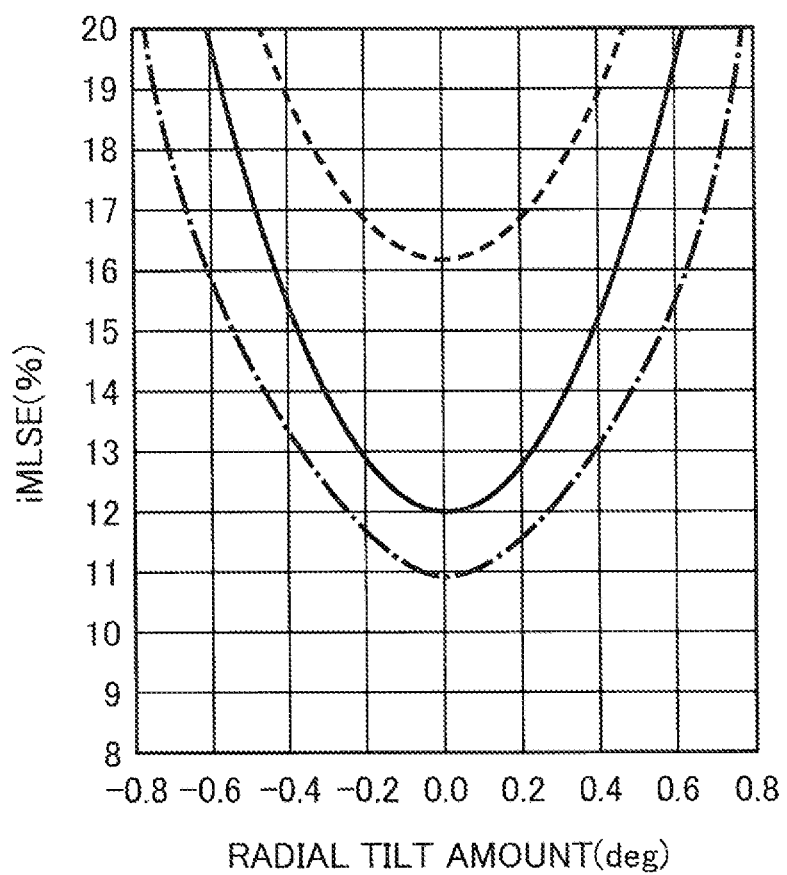
FIG. 8 is a diagram depicting results of calculations of the iMLSE made by the optical disk information device according to Embodiment 1 of the present invention in connection with occurrence of a tilt.

FIG. 8 is a diagram depicting results of calculations of the iMLSE made by the optical disk information device according to Embodiment 1 of the present invention in connection with occurrence of a tilt.

In FIG. 8, the axis of ordinate indicates the value of the iMLSE calculated as is the case with FIG. 7. The axis of abscissas indicates the amount of radial tilt.

Furthermore, a curve depicted by an alternate long and short dash line indicates the results of calculations made under the conditions for BDs (Tp=0.32 μm, λ=0.405 μm, and NA=0.85) with no crosstalk canceller applied. A curve depicted a dash line indicates the results of calculations made under the conditions according to Embodiment 1 (Tp=0.24 μm, λ=0.405 μm, and NA=0.85) with no crosstalk canceller applied. A curve depicted by a solid line indicates the results of calculations made under the conditions according to Embodiment 1 (Tp=0.24 μm, λ=0.405 μm, and NA=0.85) with a crosstalk canceller applied.

As depicted in FIG. 8, a reduction in track pitch from 0.32 μm to 0.24 μm increases the value of the iMLSE from the graph value depicted by the alternate long and short dash line to the graph value depicted by the dash line for each tilt amount. In Embodiment 1, the application of the crosstalk canceller enables a reduction in the value of the iMLSE to the graph value depicted by the solid line, indicating that a sufficient crosstalk cancellation effect can be exerted. In the calculations, the gain Kc is set to 1, and an optimum scale factor is selected and provided to the gains Kr and Kl for each tilt amount.

A method for controlling the gains Kc, Kr, and Kl in accordance with the tilt amount is not particularly limited to the above-described example. Alternatively, the optimum scale factors for the gains Kc, Kr, and Kl may be selected for a tilt amount of 0 degree, and crosstalk cancellation may be performed without optimization of the gains Kc, Kr, and Kl in accordance with the tilt amount. In this case, the accuracy of the crosstalk cancellation decreases, but a sufficient crosstalk cancellation effect is secured for reproduction and the relevant configuration is simple. Thus, response speed can be increased. If the control of the gains Kc, Kr, and Kl in accordance with the tilt amount is not performed, the tilt detector 14 can be omitted.

Now, a case will be described where a lens shift occurs in which the objective lens 3 is displaced with respect to the scanned track in the optical disk 2.

When a lens shift of the objective lens 3 is occurring with respect to the scanned track, the amount of the lens shift is detected by the lens shill detector 15. The lens shift detector 15 receives outputs from the light receiving sections 7*l* and 7*r* of the photodetector 7, and calculates and amplifies the difference between the outputs by the appropriate scale factor to obtain a calculated signal. The lens shift detector 15 then outputs the calculated signal to the gain controller 8 as a lens shift amount.

Figure 9:
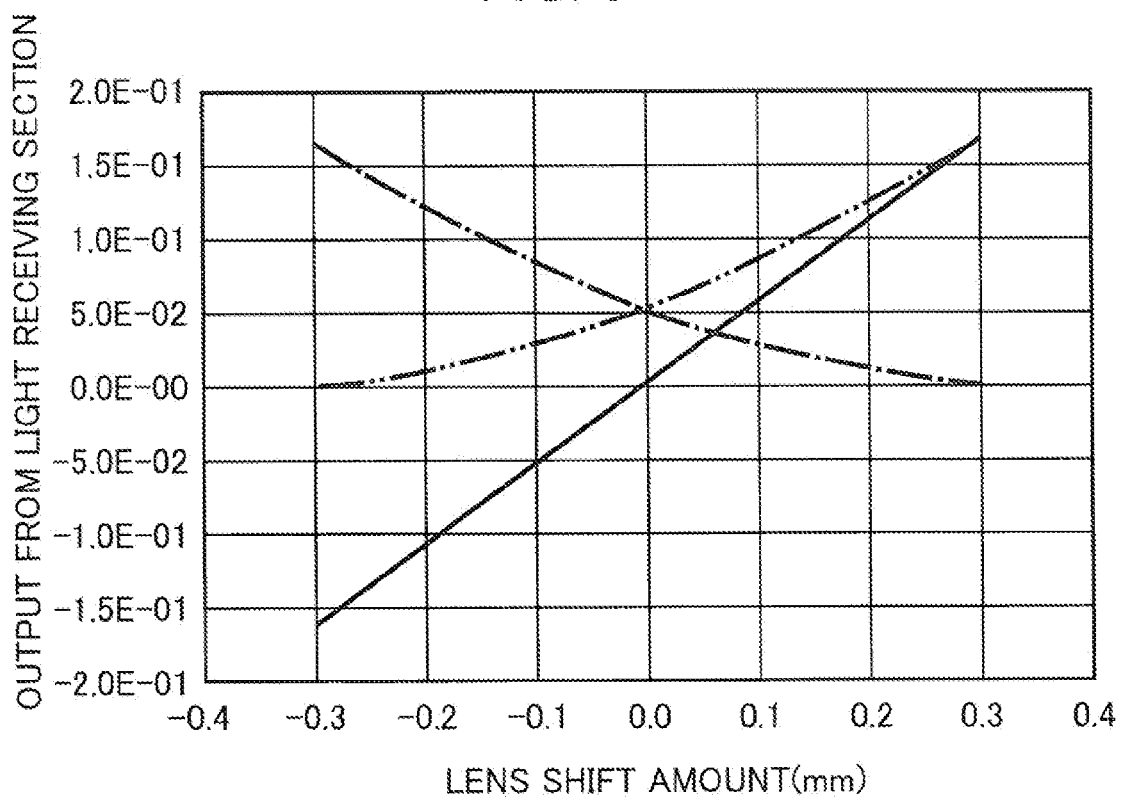
FIG. 9 is a diagram depicting results of calculations of outputs from light receiving sections made by the optical disk information device according to Embodiment 1 of the present invention in connection with occurrence of a lens shift.

FIG. 9 is a diagram depicting results of calculations of the outputs from the light receiving sections 7*l* and 7*r* made by the optical disk information device according to Embodiment 1 of the present invention in connection with occurrence of a lens shift.

In FIG. 9, the axis of ordinate indicates the outputs from the light receiving sections 7*l* and 7*r*, and the axis, of abscissas indicates the lens shift amount. Under the conditions according to Embodiment 1 (Tp=0.24 μm, λ=0.405 μm, and NA=0.85), a curve depicted by an alternate long and short dash line indicates the output from the light receiving section 7*l*. A curve depicted by an alternate long and two short dash line indicates the output from the light receiving section 7*r*. A curve depicted by a solid line indicates the difference between the output from the light receiving section 7*l* and the output from the light receiving section 7*r*. FIG. 9 depicts a sufficient linearity of the difference between the outputs from the light receiving sections 7*l* and 7*r* with respect to the lens shift amount. This indicates that the lens shift detector 15 can be utilized as a lens shift detector that detects the lens shift amount of the objective lens 3 with respect to the scanned track in the optical disk 2.

In Embodiment 1, as a method for detecting a lens shift, the lens shift detector 15 is used which obtains outputs from the light receiving sections 7*l* and 7*r* of the photodetector 7, calculates the lens shift amount based on the difference between the outputs, and outputs the lens shift amount. However, the method is not particularly limited to this example, but for example, the tracking control signal TrC from the objective lens actuator 12 may be monitored so that the lens shift amount can be estimated based on a DC component of the tracking control signal TrC.

When the lens shift amount detected by the lens shift detector 15 is input to the gain controller 8, the gain controller 8 sets the optimum gains Kc, Kr, and Kl for the amplifiers 8*c*, 8*r*, and 8*l*, respectively, in accordance with the lens shill amount. Light amount signals are amplified by the optimum gains Kc, Kr, and Kl, and the amplified signals are input to the adder 9, which outputs an information signal. As a result, the information signal output by the adder 9 contains suppressed crosstalk from the adjacent tracks and involves a reduced error rate. The reproduction signal processing section 10 can thus reproduce an accurate reproduction signal RF.

Figure 10:
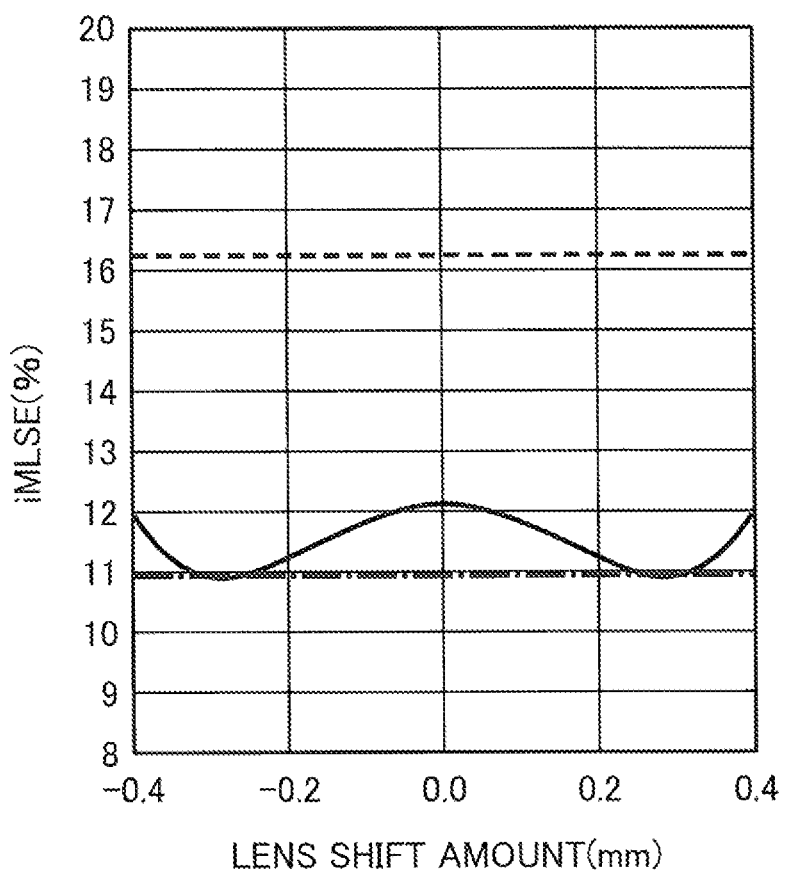
FIG. 10 is a diagram depicting results of calculations of the iMLSE made by the optical disk information device according to Embodiment 1 of the present invention in connection with occurrence of a lens shift.

FIG. 10 is a diagram depicting results of calculations of the iMLSE made by the optical disk information device according to Embodiment 1 of the present invention in connection with occurrence of a lens shift.

In FIG. 10, the axis of ordinate indicates the value of the iMLSE calculated as is the case with FIG. 7. The axis of abscissas indicates the lens shift amount.

A curve depicted by an alternate long and short dash line indicates the results of calculations made under the conditions for BDs (Tp=0.32 μm, λ=0.405 μm, and NA=0.85) with no crosstalk canceller applied. A curve depicted by a dash line indicates the results of calculations made under the conditions according to Embodiment 1 (Tp=0.24 μm, λ=0.405 μm, and NA=0.85) with no crosstalk canceller applied. A curve depicted by a solid line indicates the results of calculations made under the conditions according to Embodiment 1 (Tp=0.24 μm, λ=0.405 μm, and NA=0.85) with a crosstalk canceller applied.

As depicted in FIG. 10, in Embodiment 1, the application of the crosstalk canceller makes the value of the iMLSE slightly larger than under the conditions for BDs when the lens shift amount is 0 (mm). However, when a lens shift occurs and increases in amount, the crosstalk cancellation effect is more significantly exerted within a predetermined range. Thus, compared to the value of the dash line for non-application of the crosstalk canceller, the value for the application of the crosstalk canceller indicates a sufficient crosstalk cancellation effect. In the calculations, the gain Kc is set to 1, and the optimum scale factor is selected and provided to the gains Kr and Kl for each lens shift amount.

A method for controlling the gains Kc, Kr, and Kl in accordance with the lens shift amount is not particularly limited to the above-described example. Alternatively, the optimum scale factors for the gains Kc, Kr, and Kl may be selected for a lens shift amount of 0 mm or ±0.3 mm, and crosstalk cancellation may be performed without optimization of the gains Kc, Kr, and Kl in accordance with the lens shift amount. In this case, the accuracy of the crosstalk cancellation decreases, but a sufficient crosstalk cancellation effect is secured for reproduction and the relevant configuration is simple. Thus, response speed can be increased. If the control of the gains Kc, Kr, and Kl in accordance with the lens shift amount is not performed, the lens shift detector 15 can be omitted.

A case will be described where an off-track phenomenon occurs in which the condensing spot is displaced with respect to the scanned track in the optical disk 2.

When an off-track phenomenon occurs in which the condensing spot is displaced from the scanned track, the amount of the off-track is detected by the control signal generation section 11a of the control signal processing section 11. The control signal generation section 11a calculates the off-track amount based on the tracking error signal and outputs the off-track amount to the gain controller 8. The gain controller 8 sets the optimum gains Kc, Kr, and Kl for the amplifiers 8c, 8r, and 8l, respectively, in accordance with the off-track amount. Light amount signals are amplified by the optimum gains Kc, Kr, and Kl, and the amplified signals are input to the adder 9, which outputs an information signal. As a result, the information signal output by the adder 9 contains suppressed crosstalk from the adjacent tracks and involves a reduced error rate. The reproduction signal processing section 10 can thus reproduce an accurate reproduction signal RF.

Figure 11:
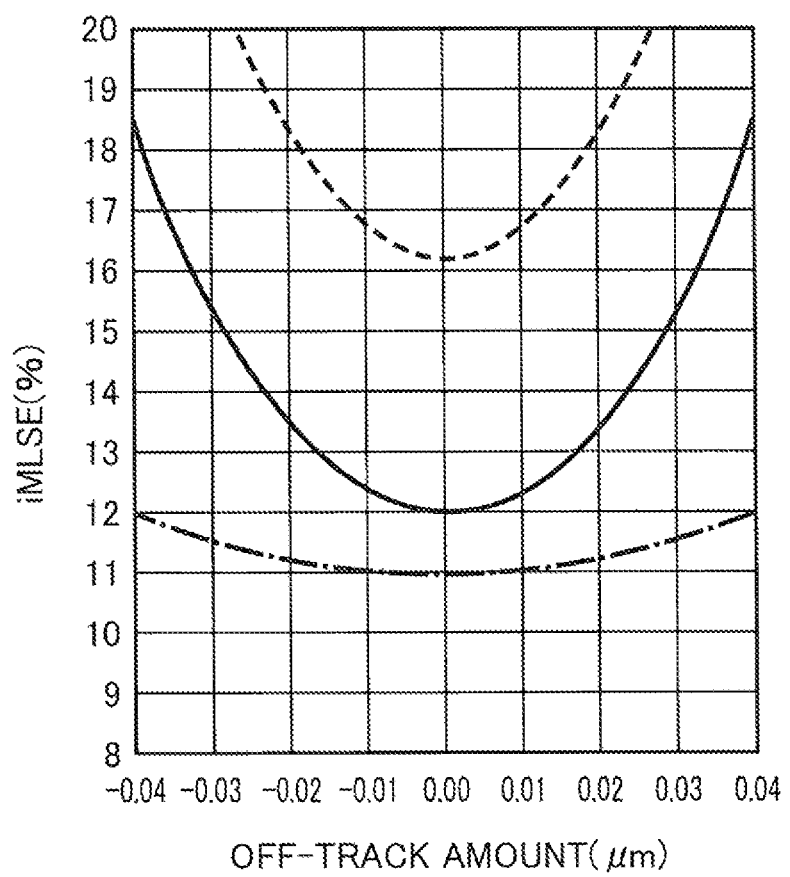
FIG. 11 is a diagram depicting results of calculations of the iMLSE made by the optical disk information device according to Embodiment 1 of the present invention in connection with an off-track phenomenon.

FIG. 11 is a diagram depicting results of calculations of the iMLSE made by the optical disk information device according to Embodiment 1 of the present invention in connection with occurrence of an off-track phenomenon occurs.

In FIG. 11, the axis of ordinate indicates the value of the iMLSE calculated as is the case with FIG. 7. The axis of abscissas indicates the off-track amount.

Furthermore, a curve depicted by an alternate long and short dash line indicates the results of calculations made under the conditions for BDs (Tp=0.32 µm, λ=0.405 µm, and NA=0.85) with no crosstalk canceller applied. A curve depicted by a dash line indicates the results of calculations made under the conditions according to Embodiment 1 (Tp=0.24 µm, λ=0.405 µm, and NA=0.85) with no crosstalk canceller applied. A curve depicted by a solid line indicates the results of calculations made under the conditions according to Embodiment 1 (Tp=0.24 µm, λ=0.405 µm, and NA=0.85) with a crosstalk canceller applied.

As depicted in FIG. 11, a reduction in track pitch from 0.32 µm to 0.24 µm increases the value of the iMLSE from the graph value depicted by the alternate long and short dash line to the graph value depicted by the dash line for each off-track amount. In Embodiment 1, the application of the crosstalk canceller enables a reduction in the value of the iMLSE to the graph value depicted by the solid line, indicating that a sufficient crosstalk cancellation effect can be exerted. In the calculations, the gain Kc is set to 1, and the optimum scale factor is selected and provided to the gains Kr and Kl for each off-track amount.

A method for controlling the gains Kc, Kr, and Kl in accordance with the off-track amount is not particularly limited to the above-described example. Alternatively, the optimum scale factors for the gains Kc, Kr, and Kl may be selected for an off-track amount 0 µm, and crosstalk cancellation may be performed without optimization of the gains Kc, Kr, and Kl in accordance with the off-track amount. In this case, the accuracy of the crosstalk cancellation decreases, but a sufficient crosstalk cancellation effect is secured for reproduction and the relevant configuration is simple. Thus, response speed can be increased.

Furthermore, the control method in accordance with the tilt amount, the control method in accordance with the lens shift amount, and the control method in accordance with the off-track amount may be optionally combined together. For example, when a tilt of the optical disk 2, a lens shift of the objective lens 3, and an off-track phenomenon of the condensing spot are simultaneously occurring, the gain controller 8 sets the optimum gains Kc, Kr, and Kl for the amplifiers 8c, 8r, and 8l, respectively, in accordance with the tilt amount obtained from the tilt detector 14, the lens shift amount obtained from the lens shift detector 15, and the off-track amount obtained from the control signal generation section 11a. Light amount signals are amplified by the optimum gains Kc, Kr, and Kl, and the amplified signals are input to the adder 9, which outputs an information signal. As a result, the information signal output by the adder 9 contains suppressed crosstalk from the adjacent tracks and involves a reduced error rate. The reproduction signal processing section 10 can thus reproduce an accurate reproduction signal RF.

In this regard, since the land portion and the groove portion in the optical disk 2 differ in reflectance and in the phase of a light beam of reflected light, the relation between the scanned track and the adjacent tracks is inverted depending on whether the scanned track corresponds to the land portion or the groove portion. The inversion disables the effects of the crosstalk canceller.

Thus, in Embodiment 1, the gain controller 8 obtains, from the tracking switcher 11b, timing information on switching of the polarity of the tracking control signal and information allowing determination of whether the track scanned by the condensing spot corresponds to the land portion L or the groove portion G. The gain controller 8 thus sets different gains Kc, Kr, and Kl for the amplifiers 8e, 8r, and 8l, respectively, depending on whether the track scanned by the condensing spot corresponds to the land portion L or the groove portion G. This enables the combination of the scale factors for the gains Kc, Kr, and Kl generated by the gain controller 8 to be switched in conjunction with switching between the land portion L and the groove portion G Outputs resulting from switched combinations of the scale factors for the gains Kc, Kr, and Kl are input to the adder 9. The information signal contains suppressed crosstalk from the adjacent tracks and involves a reduced error rate. The reproduction signal processing section 10 can thus reproduce an accurate reproduction signal RF.

Alternatively, in conjunction with the switching between the land portion L and the groove portion G, land portion gain initial values and groove portion gain initial values pre-acquired during manufacturing, learning, or the like may be set to be the gains Kc, Kr, and Kl. In this case, the gain controller 8 pre-stores the land portion gain initial values and the groove portion gain initial values, which are different from each other, in an internal memory (not depicted in the drawings). When the polarity of the tracking control signal is inverted, if the track scanned by the condensing spot corresponds to the land portion the gain controller 8 reads the land portion gain initial values from the memory and sets the land portion gain initial values for the amplifiers 8c, 8r, and 8l as the gains Kc, Kr, and Kl. If the track scanned by the condensing spot corresponds to the groove portion G, the gain controller 8 reads the groove portion gain initial values from the memory and sets the groove portion gain initial values for the amplifiers 8c, 8r, and 8l.

In this regard, the crosstalk cancellation effect is determined by the ratio between the gains Kc, Kr, and Kl provided for the amplifiers 8c, 8r, and 8l, respectively. Thus, for simplification calculations, the gain controller 8 sets the gain Kc to 1, and sets the land portion gain initial values and the groove portion gain initial values to be the values of the gains Kr and Kl. The values of the gains Kc, Kr, and Kl are effective when given as DC values. However, the values of the gains Kc, Kr, and Kl are more effective when given as tap coefficients for a digital filter with a frequency characteristic. In this case, due to a disk format (the ratio between the land portion and the groove portion, the groove depth, and the like), the land portion L and the groove portion C vary in the magnitudes of crosstalk and media noise, and the optimum tap coefficients are different between the land portion L and the groove portion G.

Figure 12:
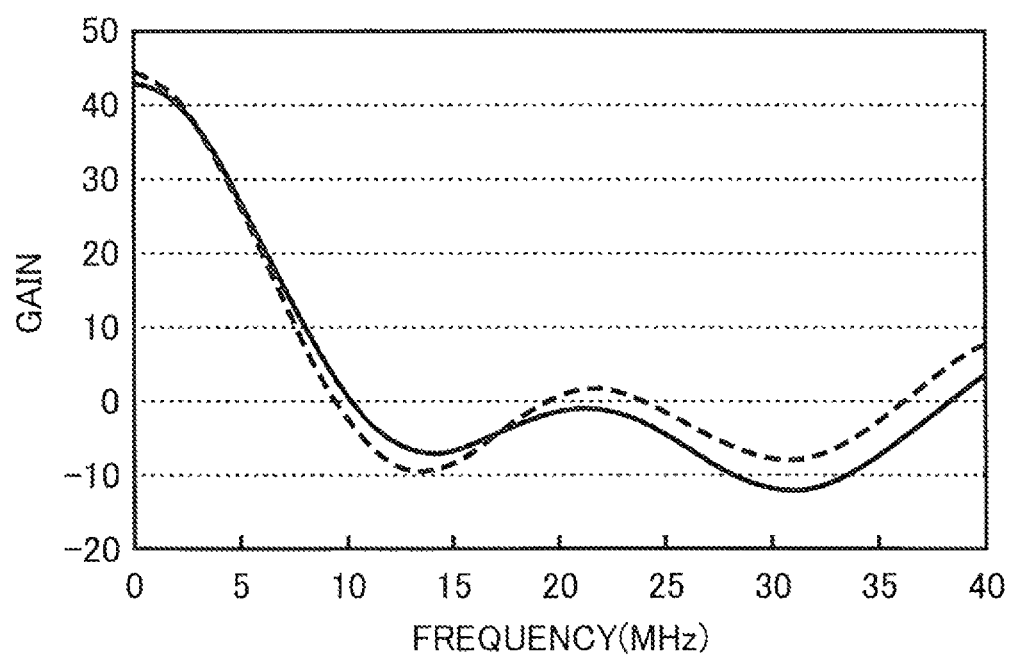
FIG. 12 is a diagram depicting an example of a frequency characteristic of a digital filter obtained using land portion gain initial values and groove portion gain initial values in the optical disk information device according to Embodiment 1 of the present invention.

FIG. 12 is a diagram depicting an example of a frequency characteristic of a digital filter obtained using the land portion gain initial values and the groove portion gain initial values in the optical disk information device according to Embodiment 1 of the present invention. FIG. 12 depicts, by a dash line, the frequency characteristic of the digital filter provided as the gain Kr (when Kr=Kl) by an optimum tap coefficient for the land portion L, and depicts, by a solid line, the frequency characteristic of the digital filter provided as the gain Kr (when Kr=Kl) by the optimum tap coefficient for the groove portion G.

In order to function as a digital filter with the above-described frequency characteristic, the gain controller 8 sets the land portion gain initial values and the groove portion gain initial values to be the gains Kc, Kr, and Kl in conjunction with the switching between the land portion L and the groove portion G. Thus, initial values for the tap coefficients to be applied to the land portion L and the groove portion C are prepared in advance as the land portion gain initial values and the groove portion gain initial values. When switching is performed between the land portion L and the groove portion C for reproduction, the optimization calculation is started with the tap coefficients, enabling a reduction in optimization time.

Furthermore, in Embodiment 1, the optical disk 2 is of a type in which information is recorded on the land portion L and groove portion G of the groove, and has a groove pitch Gp of 0.48 μm and a track pitch Tp of 0.24 μm. However, the groove pitch Gp is not particularly limited to this example, but even a different groove pitch Gp allows exertion of an effect approximately similar to the above-described effect provided that $(GP/2)<\lambda/(2 \cdot NA)$ is satisfied. Furthermore, even a different groove pitch Gp allows sufficient exertion of an effect similar to the above-described effect provided that $(GP/2)<(1.2 \cdot \lambda)/(2 \cdot NA)$ is satisfied.

Moreover, the optical disk information device according to Embodiment 1, as a single device, is not limited to performance of recording and reproduction for a single type of groove pitch Gp but may be compatible with performance of recording and reproduction on optical disks with a plurality of different types of groove pitches.

In this case, for example, the reproduction signal processing section 10 extracts information on the track pitch Tp from disk information pre-recorded in the optical disk 2 and outputs the information to the gain controller 8. The gain controller 8 sets different gains Kc, Kr, and Kl for the amplifiers 8c, 8r, and 8l, respectively, in accordance with the track pitch Tp of the optical disk 2. When the combination of the scale factors for the gains Kc, Kr, and Kl generated by the gain controller 8 is thus switched in accordance with the groove pitch Gp of the optical disk 2 on which recording or reproduction is performed, crosstalk can be suppressed even when an optical disk with a different groove pitch Gp is used. As a result, outputs resulting from switched combinations of the scale factors for the gains Kc, Kr, and Kl are input to the adder 9. The information signal contains suppressed crosstalk from the adjacent tracks and involves a reduced error rate. The reproduction signal processing section 10 can thus reproduce an accurate reproduction signal RF.

In Embodiment 1, as the values for the gains Kc, Kr, and Kl of the amplifiers 8c, 8r, and 8l, Kc=1 (a factor of 1). Kr=Kl, and the optimized gain values are provided for Kr and Kl. However, Kr and Kl are not necessarily equal to each other. Selecting the optimum values for Kr and Kl allows crosstalk to be more accurately suppressed.

Embodiment 2

Figure 13:
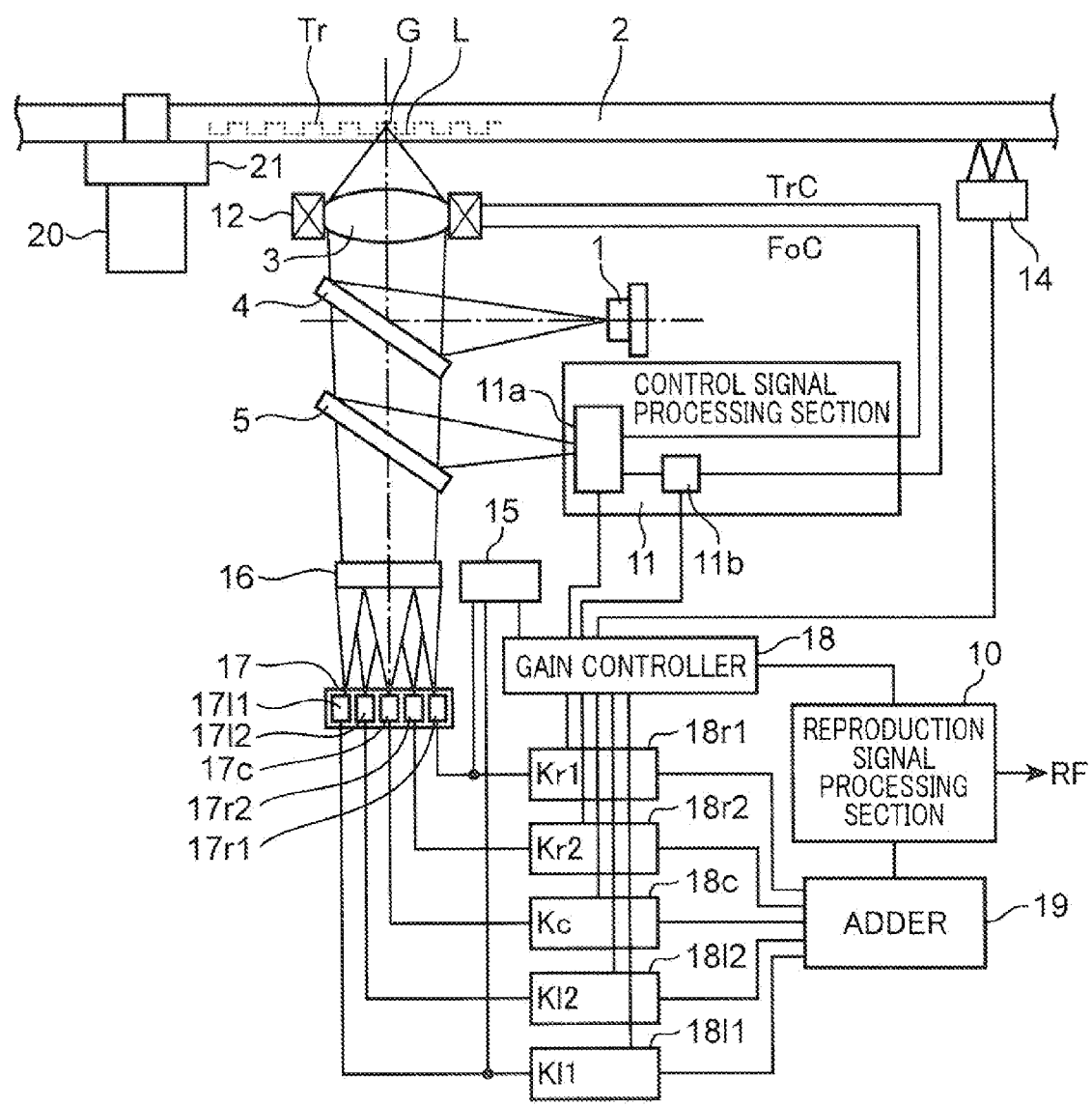
FIG. 13 is a schematic diagram depicting a configuration of an optical disk information device according to Embodiment 2 of the present invention.
Figure 14:
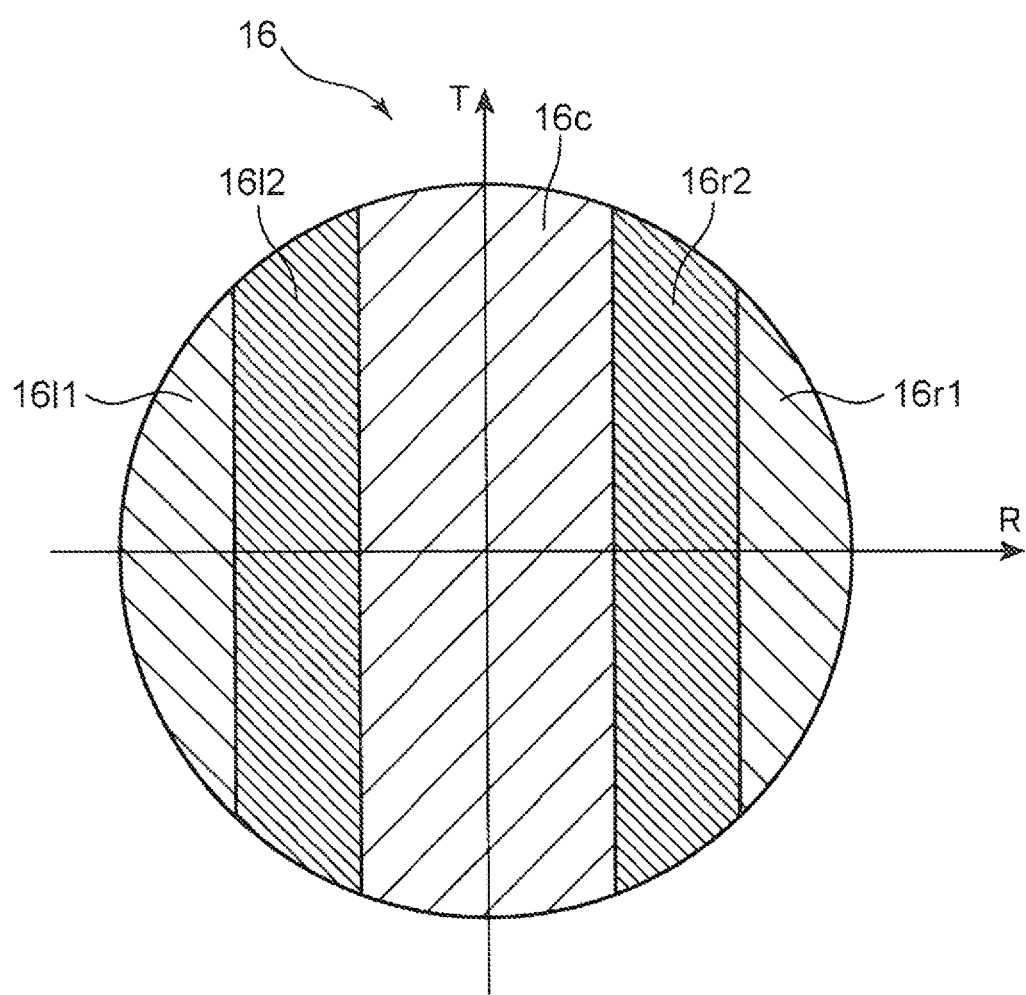
FIG. 14 is a schematic diagram depicting a division configuration of a splitting element in the optical disk information device according to Embodiment 2 of the present invention.

FIG. 13 is a schematic diagram depicting a configuration of an optical disk information device according to Embodiment 2 of the present invention. FIG. 14 is a schematic diagram depicting a division configuration of a splitting element in the optical disk information device according to Embodiment 2 of the present invention.

The same components in FIG. 13 as the corresponding components in FIG. 1 are denoted by the same reference numerals and will not be described below.

The device in FIG. 13 is different from the device in FIG. 1 in that the device in FIG. 13 uses a splitting element 16, a photodetector 17, a gain controller 18, amplifiers 18c, 18r1, 18r2, 18/1, and 18/2, and an adder 19 instead of a splitting element 6, a photodetector 7, a gain controller 8, amplifiers 8c, 8r, and 8l, and an adder 9.

The splitting element 16 is a diffraction element with fine grooves formed on a glass surface so as to operate as a diffraction grating. As depicted in FIG. 14, the splitting element 16 is divided into five areas in a direction corresponding to a radial direction R of an optical disk 2, that is, a central portion area 16c, two end portion areas 16r2 and 16/2 between which the central portion area 16c is sandwiched, and two end portion areas 16r1 and 16/1 between which the two end portion areas 16r2 and 16/2 are sandwiched. A light beam having passed through these areas is separated into light beams traveling in different directions by means of the diffraction gratings in the respective areas. In Embodiment 2, the widths of the respective areas of the splitting element 16 in the radial direction R is such that, when the diameter of the light beam is defined to be 100%, the width of the end portion area 16r1: the width of the end portion area 16r2: the width of the central portion area 16c: the width of the end portion area 16/2: the width of the end portion area 16/1=16.7%: 16.7%: 33.3%: 16.7%: 16.7%.

The widths of the division areas (the central portion area 16c and the end portion areas 16r1, 16r2, 16/1, and 16/2) can be appropriately set to the optimum values depending on conditions.

Since the splitting element 16 is a five-piece element, the photodetector 17 includes five light receiving sections 17r1, 17r2, 17c, 17l2, and 17l1. The gain controller 18 also controls five types of amplifiers 18r1, 18r2, 18c, 18l2, and 18l1 to provide gains Kr1, Kr2, Kc, Kl2, and Kl1 to the amplifiers 18r1, 18r2, 18e, 18l2, and 18l1, respectively. Furthermore, the adder 19 adds together light amount signals resulting from amplification by the optimum gains Kr1, Kr2, Kc, Kl2, and Kl1 and outputs an information signal to a reproduction signal processing section 10.

As described above, in Embodiment 2, the splitting element 16 is divided into five areas to allow crosstalk from the adjacent tracks to be corrected in further detail.

Therefore, not only effects similar to the effects of the optical disk information device in FIG. 1 can be exerted but also the information signal output by the adder 19 contains more minutely suppressed crosstalk from the adjacent tracks and involves a more significantly reduced error rate. The reproduction signal processing section 10 can thus reproduce a more accurate reproduction signal RF.

Embodiment 3

Figure 15:
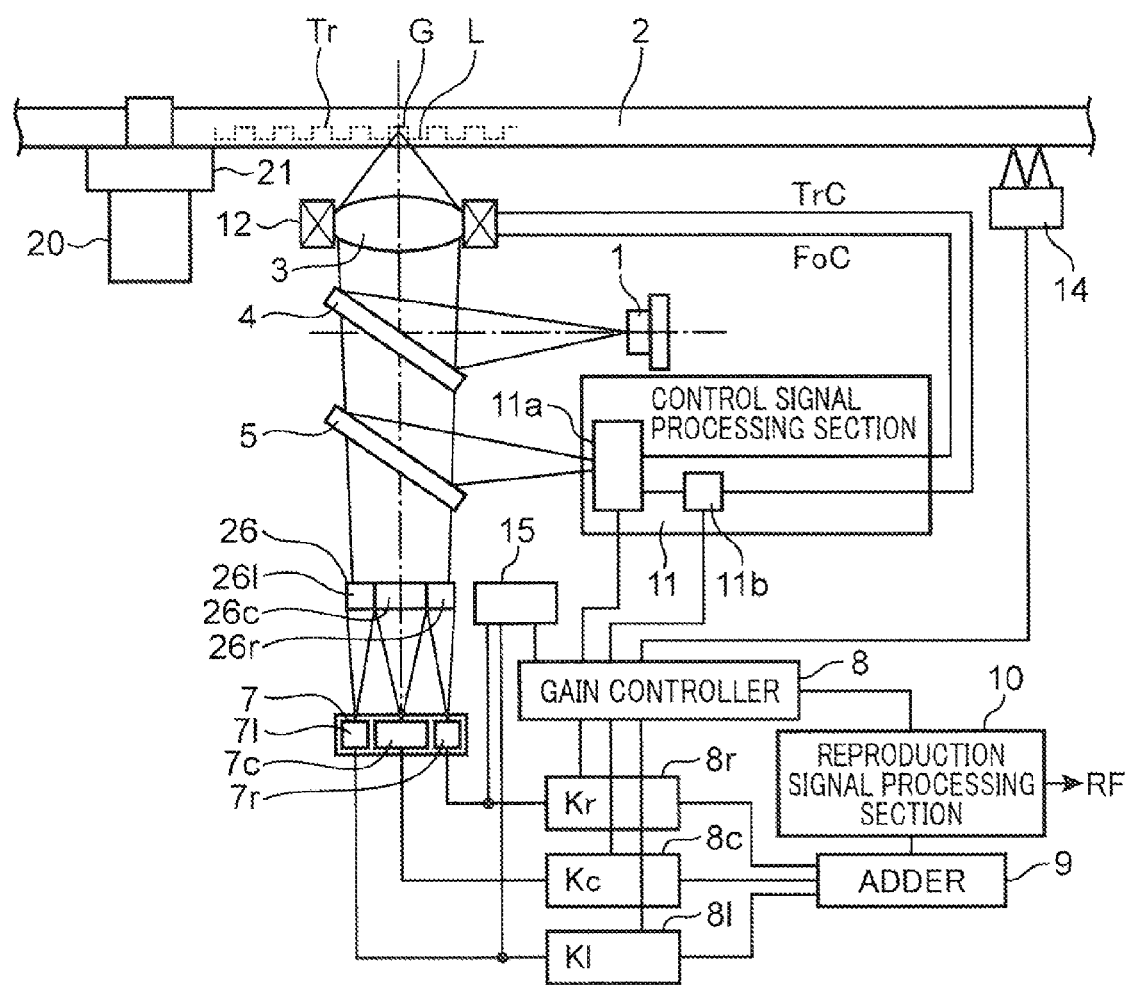
FIG. 15 is a schematic diagram depicting a configuration of an optical disk information device according to Embodiment 3 of the present invention.
Figure 16:
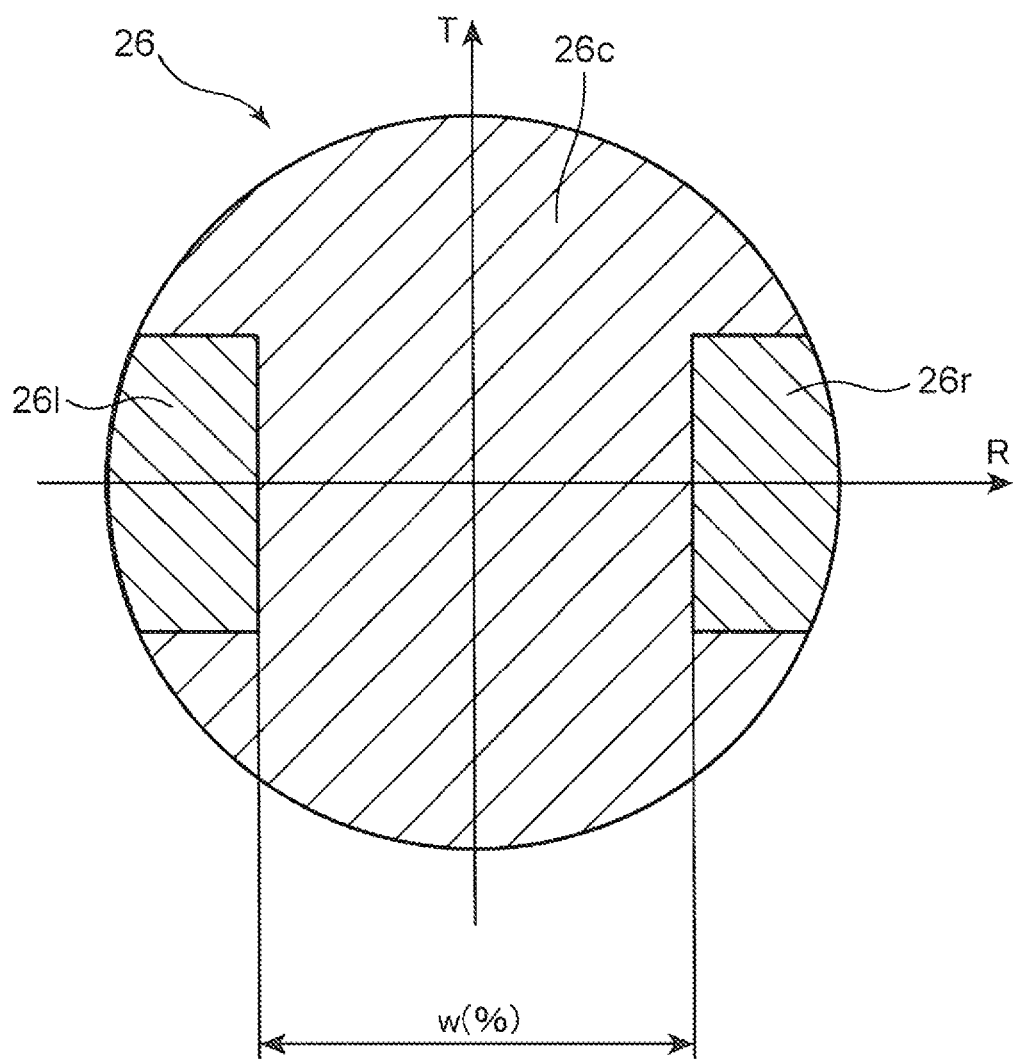
FIG. 16 is a schematic diagram depicting a division configuration of a splitting element in the optical disk information device according to Embodiment 3 of the present invention.

FIG. 15 is a schematic diagram depicting a configuration of an optical disk information device according to Embodiment 3 of the present invention. FIG. 16 is a schematic diagram depicting a division configuration of a splitting element in the optical disk information device according to Embodiment 3 of the present invention.

The same components in FIG. 15 as the corresponding components in FIG. 1 are denoted by the same reference numerals and will not be described below.

The device in FIG. 15 is different from the device in FIG. 1 in that the device in FIG. 15 uses a splitting element 26 instead of a splitting element 6. The splitting element 26 is a diffraction element with fine grooves formed on a glass surface so as to operate as a diffraction grating. As depicted in FIG. 16, the splitting element 26 is divided into three areas in a direction corresponding to a radial direction R of an optical disk 2. Two end portion areas 26r and 26l are both cut into upper and lower portions, respectively, along a boundary line parallel to the radial direction R. Thus, the splitting element 26 has a centrally positioned and generally H-shaped (as viewed by assuming a tangential direction T of the optical disk 2 to be a horizontal direction) central portion area 16c and two rectangular (general rectangles with three linear sides and one circular arc side) end portion areas 26r and 26l between which the central portion area 6c is sandwiched.

A light beam having passed through these areas is separated into light beams traveling in different directions by means of the diffraction gratings in the respective areas.

Since the splitting element 26 is a three-piece element, as is the case with FIG. 1, a photodetector 7 also includes three light receiving sections 7c, 7r, and 7l, and a gain controller 18 also controls three types of amplifiers 8c, 8r, and 8l to provide gains Kc, Kr, and Kl to the amplifiers 8c, 8r, and 8l, respectively.

As described above, in Embodiment 3, the splitting element 26 is divided into three areas in a pattern as depicted in FIG. 16, and thus, correction of crosstalk is performed only on an area in which crosstalk from the adjacent tracks concentrates. This allows crosstalk from the adjacent tracks to be more minutely corrected.

Thus, not only effects similar to the effects of the optical disk information device in FIG. 1 can be exerted but also an information signal output by an adder 9 contains more minutely suppressed crosstalk and involves a more significantly reduced error rate. The reproduction signal processing section 10 can thus reproduce a more accurate reproduction signal RF.

Figure 17:
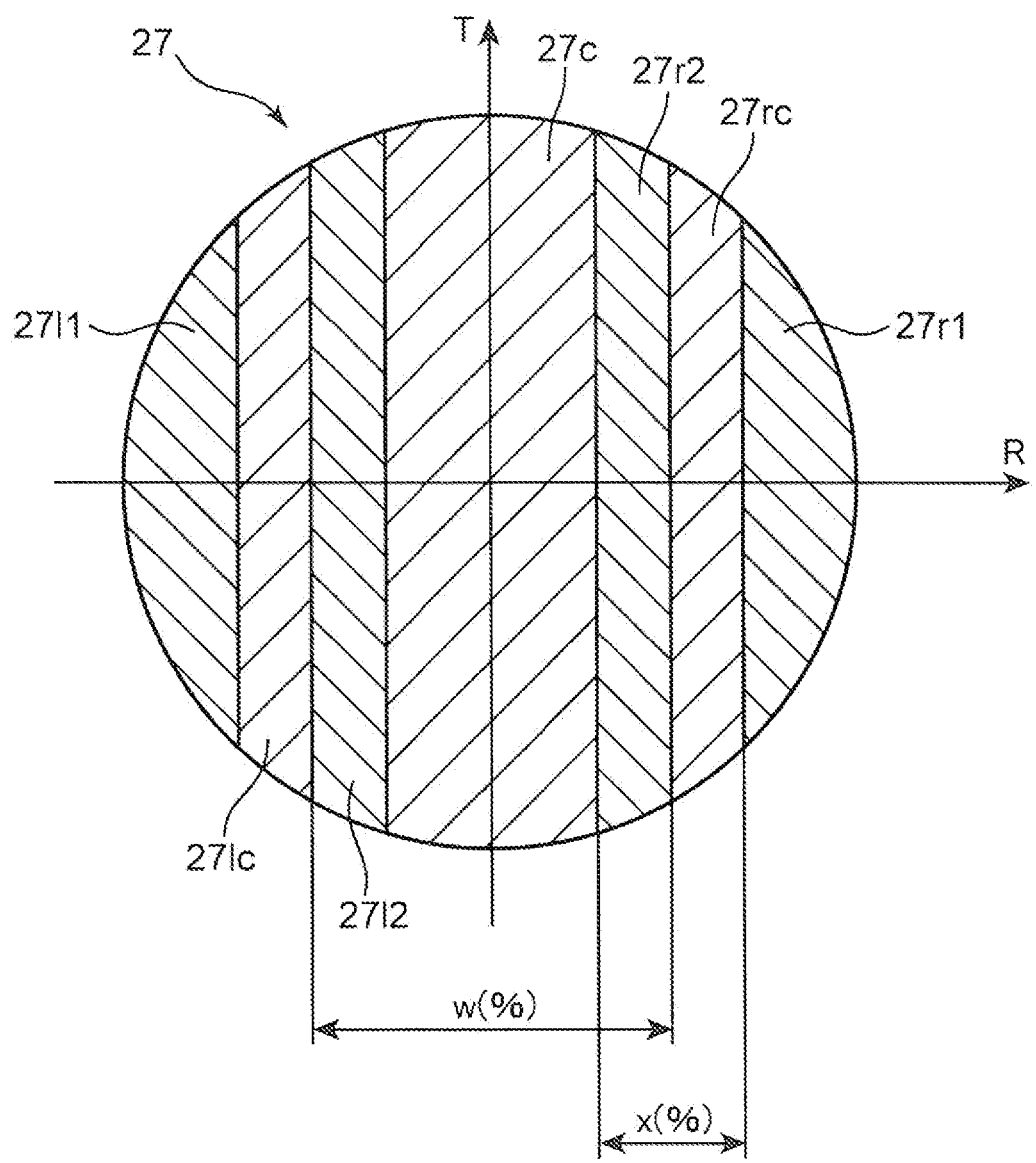
FIG. 17 is a schematic diagram depicting a division configuration of another splitting element used for the optical disk information device according to Embodiment 3 of the present invention.

In Embodiment 3, the splitting element that can be used instead of the splitting element 6 is not limited to the splitting element 26 but may be, for example, a splitting element described below. FIG. 17 is a schematic diagram depicting a division configuration of a splitting element used for the optical disk information device according to Embodiment 3 of the present invention.

As depicted in FIG. 17, a splitting element 27 is divided into seven areas in the direction corresponding to the radial direction R of the optical disk 2. The splitting element 28 has a centrally positioned first central portion area 27c, two first end portion areas 27r2 and 27l2 between which the first central portion area 27c is sandwiched, two central portion areas 27rc and 27lc between which the two first end portion areas 27r2 and 27l2 are sandwiched, and two second end portion areas 27r1 and 27l1 between which the two second central portion areas 27rc and 27lc are sandwiched.

A light beam having passed through these areas is separated into light beams traveling in different directions by means of the diffraction gratings in the respective areas. A light receiving section 7c receives three light beams from the first central portion area 27e and the second central portion areas 27rc and 27lc and outputs light amount signals corresponding to the amounts of light in the three received light beams. A light receiving section 7r receives two light beams from the first end portion area 27r2 and the second end portion area 27r1 and outputs light amount signals corresponding to the amounts of light in the two received light beams. A light receiving section 7l receives two light beams from the first end portion area 27l2 and the second end portion area 27l1 and outputs light amount signals corresponding to the amounts of light in the two received light beams.

In Embodiment 3, a width w of the splitting element 27 in the radial direction R is the sum of the width of the first central portion area 27c and the widths of the two first end portion areas 27r2 and 27l2. A width x is the sum of the width of the first end portion area 27r2 and the width of the second central portion area 27rc and is equal to the sum of the width of the first end portion area 27l2 and the width of the second central portion area 27lc.

Furthermore, the splitting element 27 is divided into areas that are laterally symmetric with respect to an axis in the tangential direction T serving as a center axis. The width of the first end portion area 27r2 is equal to the width of the second central portion area 27rc. The width of the first end portion area 27l2 is equal to the width of the second central portion area 27lc. Thus, the width w of the splitting element 27 in the radial direction R is the sum of the width of the first central portion area 27c and the widths of the two second central portion areas 27rc and 271e and provides the width of the central portion areas.

As described above, if the splitting element 27 is divided into a number of areas, when the diameter of a light beam is defined to be 100%, the width w of the splitting element 27 is preferably 35% or more and 55% or less. The width x is preferably 10%±5%. The widths of the division areas (the first central portion area 27c, the two first end portion areas 27r2 and 27l2, the two second central portion areas 27rc and 27lc, and the two second end portion areas 27r1 and 27l1) can be appropriately set to the optimum values depending on conditions.

As described above, in the present example, the splitting element 27 is divided into seven areas in a pattern as depicted in FIG. 17, and thus, crosstalk from the adjacent tracks can be more minutely corrected.

Figure 18:
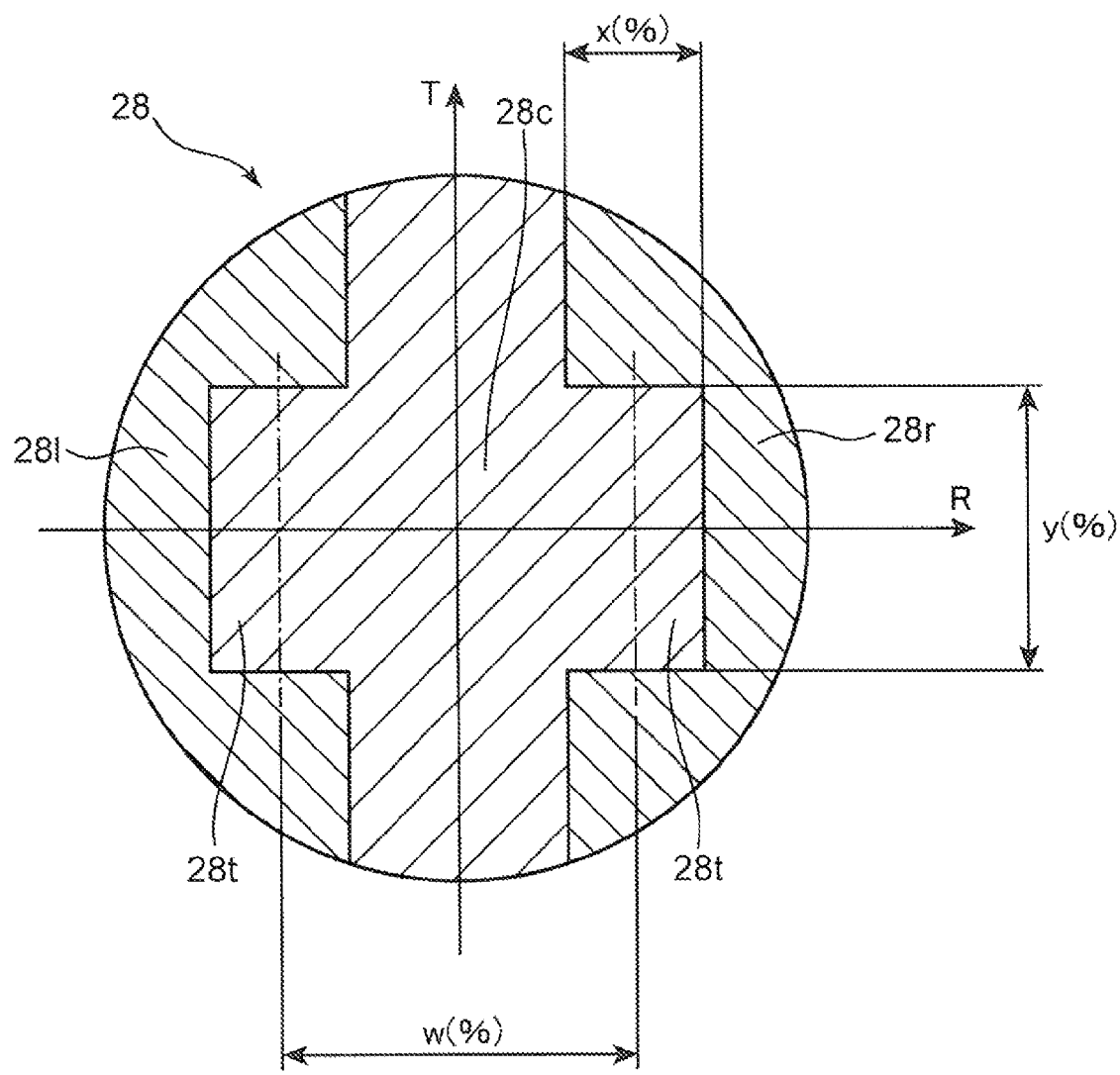
FIG. 18 is a schematic diagram depicting a division configuration of yet another splitting element used for the optical disk information device according to Embodiment 3 of the present invention.

FIG. 18 is a schematic diagram depicting a division configuration of another splitting element used for the optical disk information device according to Embodiment 3 of the present invention.

As depicted in FIG. 18, a splitting element 28 is divided into three areas in the direction corresponding to the radial direction R of the optical disk 2, and has a centrally positioned and generally cross-shaped central portion area 28c and two generally C-shaped end portion areas 28r and 28l between which the central portion area 28c is sandwiched (however, in FIG. 18, the end portion area 28r is generally inversely C-shaped). The central portion area 28c has rectangular projecting portions 28t on both sides thereof. The end portion areas 28r and 28l have recess portions that engage with the projecting portions 28t of the central portion area 28c.

A light beam having passed through these areas is separated into light beams traveling in different directions by means of the diffraction gratings in the respective areas. The light receiving section 7c receives a light beam from the central portion area 28c and outputs a light amount signal corresponding to the amount of light in the received light beam. The light receiving section 7r receives a light beam from the end portion area 28r and outputs a light amount signal corresponding to the amount of light in the received light beam. The light receiving section 7l receives a light beam from the end portion area 28l and outputs a light amount signal corresponding to the amount of light in the received light beam.

In Embodiment 3, a width w of the splitting element 28 in the radial direction R is the width between center axes of the two projecting portions 28t of the central portion area 28c which axes are parallel to the tangential direction T. A width x is the width of the projecting portion 28t of the central portion area 28c in the radial direction R. A width y is the width of the projecting portion 28t of the central portion area 28c in the tangential direction T. Furthermore, the splitting element 28 is divided into areas that are laterally symmetric with respect to the axis in the tangential direction T serving as a center axis. The width of the central portion area 28c with the two projecting portions 28t in the radial direction R is the sum of the width w and the width x. The width w of the splitting element 28 in the radial direction R is equal to the substantial width of the central portion area 28c.

As described above, if the splitting element 28 is divided into a number of areas, when the diameter of a light beam is defined to be 100%, the width w of the splitting element 28 is preferably 45% or more and 60% or less. The width x is preferably 10%±5%. The width y is preferably 35%±5%. The widths of the division areas (the central portion area 28c and the two end portion areas 28r and 28l) can be appropriately set to the optimum values depending on conditions.

As described above, in the present example, the splitting element 28 is divided into three areas in a pattern as depicted in FIG. 18, and thus, correction of crosstalk is performed depending on an area in which crosstalk from the adjacent tracks concentrates. This allows crosstalk from the adjacent tracks to be more minutely corrected.

Figure 19:
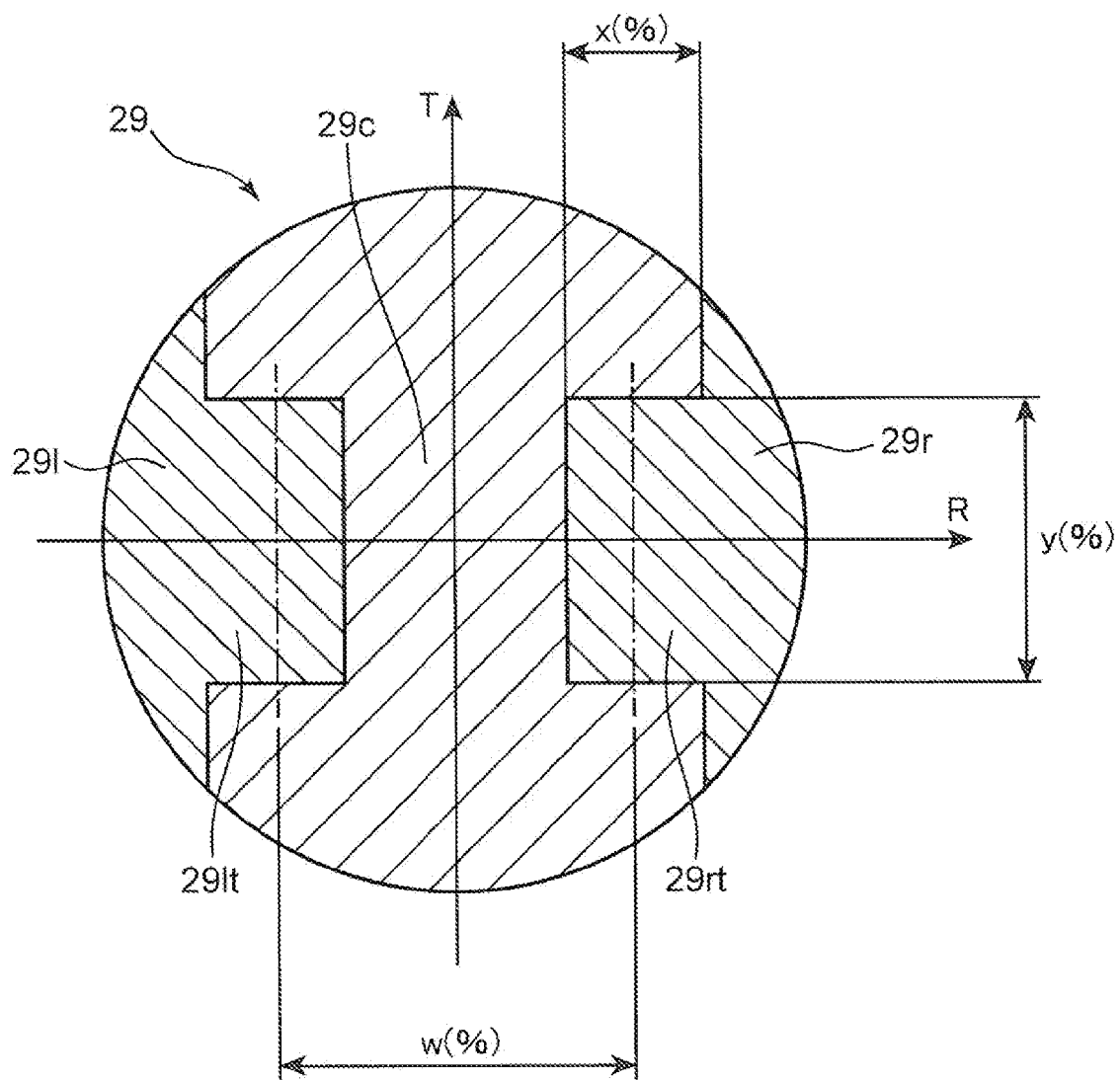
FIG. 19 is a schematic diagram depicting a division configuration of still another splitting element used for the optical disk information device according to Embodiment 3 of the present invention.

FIG. 19 is a schematic diagram depicting a division configuration of yet another splitting element used for the optical disk information device according to Embodiment 3 of the present invention.

As depicted in FIG. 19, a splitting element 29 is divided into three areas in the direction corresponding to the radial direction R of the optical disk 2, and has a centrally positioned and generally H-shaped (as viewed by assuming the tangential direction T of the optical disk 2 to be the horizontal direction) central portion area 29c and two generally T-shaped end portion areas 29r and 29l (the end portion area 29l is generally T-shaped and the end portion area 29r is generally inversely T-shaped as viewed by rotating FIG. 19 clockwise through 90 degrees so that the tangential direction T of the disk is assumed to be the horizontal direction) between which the central portion area 29c is sandwiched. The central portion area 29c has recess portions on both sides of an axis in the radial direction R. The end portion areas 29r and 29l have rectangular projecting portions 29rt and 29lt that engage with the recess portions of the central portion area 29c.

A light beam having passed through these areas is separated into light beams traveling in different directions by means of the diffraction gratings in the respective areas. The light receiving section 7c receives a light beam from the central portion area 29c and outputs a light amount signal corresponding to the amount of light in the received light beam. The light receiving section 7r receives a light beam from the end portion area 29r and outputs a light amount signal corresponding to the amount of light in the received light beam. The light receiving section 7l receives a light beam from the end portion area 29l and outputs a light amount signal corresponding to the amount of light in the received light beam.

In Embodiment 3, a width w of the splitting element 29 in the radial direction R is the width between center axes of the projecting portions 29rt and 29lt of the end portion areas 29r and 29l which axes are parallel to the tangential direction T. A width x is the width of each of the projecting portions 29rt and 29lt (the recess portions of the central portion area 29c) of the end portion areas 29r and 29l in the radial direction R. A width y is the width of each of the projecting portions 29rt and 29lt (the projecting portions of the central portion area 29c) of the end portion areas 29r and 29l in the tangential direction T. Furthermore, the splitting element 29 is divided into areas that are laterally symmetric with respect to the axis in the tangential direction T serving as a center axis. The width of the central portion area 29c in the radial direction R is equal to the width w minus the width x. The width w of the splitting element 29 in the radial direction R is equal to the substantial width of the central portion area 29c.

As described above, if the splitting element 29 is divided into a number of areas, when the diameter of a light beam is defined to be 100%, the width w of the splitting element 29 is preferably 45% or more and 60% or less. The width x is preferably 10%±5%. The width y is preferably 35%±5%. The widths of the division areas (the central portion area 29c and the two end portion areas 29r and 29l) can be appropriately set to the optimum values depending on conditions.

As described above, in the present example, the splitting element 29 is divided into three areas in a pattern as depicted in FIG. 19, and thus, correction of crosstalk is performed depending on an area in which crosstalk from the adjacent tracks concentrates. This allows crosstalk from the adjacent tracks to be more minutely corrected.

Embodiment 4

Figure 20:
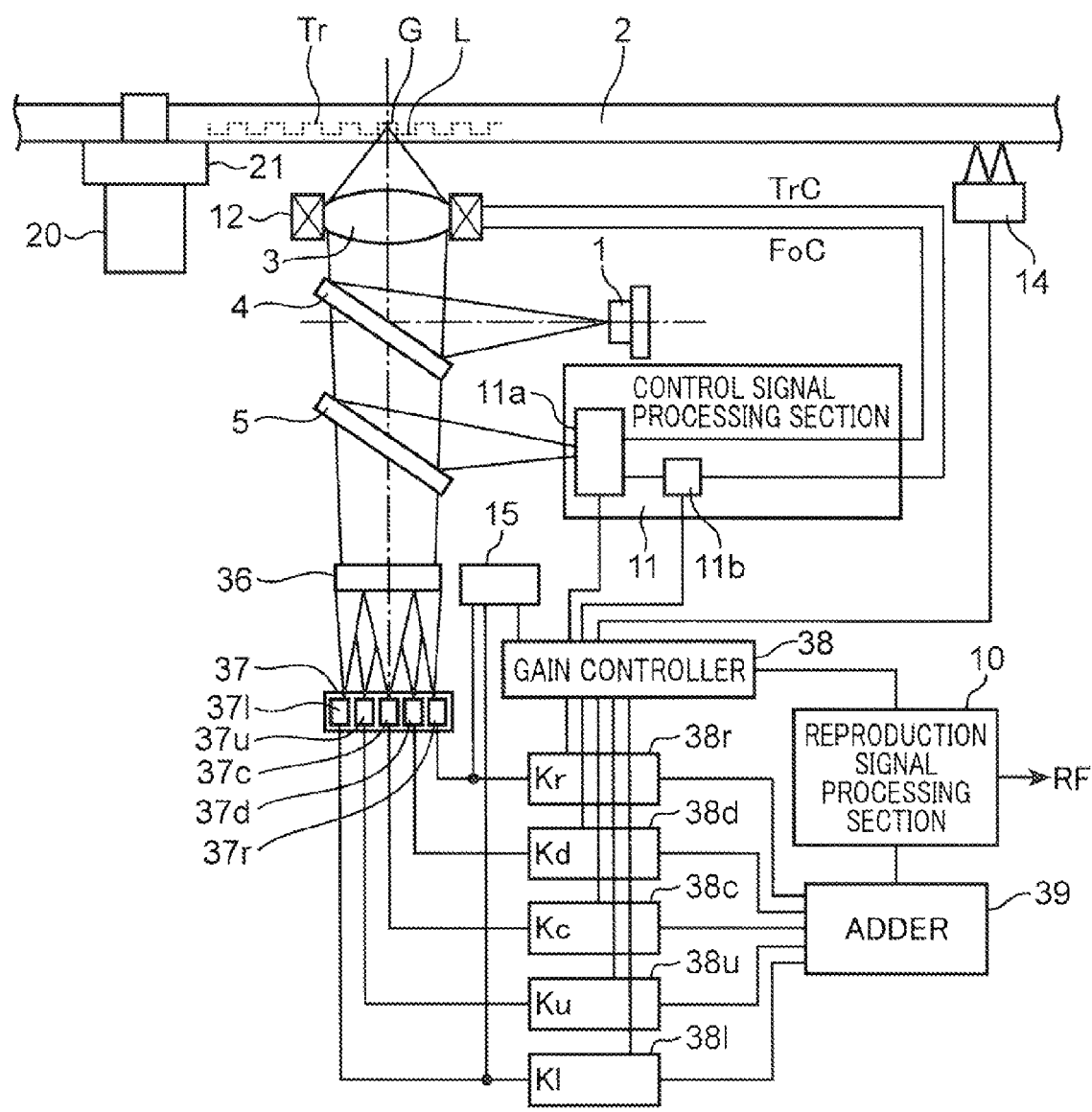
FIG. 20 is a schematic diagram depicting a configuration of an optical disk information device according to Embodiment 4 of the present invention.
Figure 21:
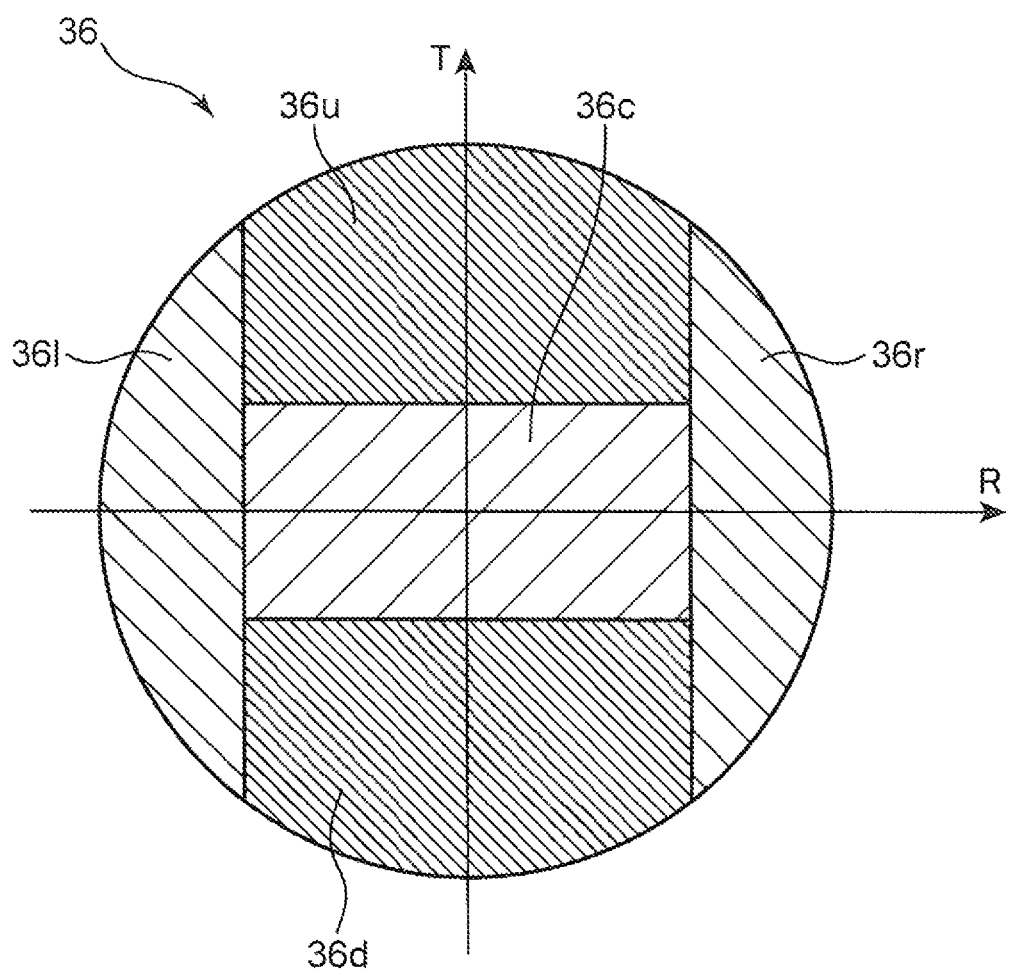
FIG. 21 is a schematic diagram depicting a division configuration of a splitting element in the optical disk information device according to Embodiment 4 of the present invention.

FIG. 20 is a schematic diagram depicting a configuration of an optical disk information device according to Embodiment 4 of the present invention. FIG. 21 is a schematic diagram depicting a division configuration of a splitting element in the optical disk information device according to Embodiment 4 of the present invention.

The same components in FIG. 20 as the corresponding components are denoted by the same reference numerals and will not be described below.

The device in FIG. 20 is different from the device in FIG. 1 is that the device in FIG. 20 uses a splitting element 36, a photodetector 37, a gain controller 38, amplifiers 38c, 38r, 38d, 38u, and 38l, and an adder 39 instead of a splitting element 6, a photodetector 7, a gain controller 8, amplifiers 8c, 8r, and 8l, and an adder 9.

The splitting element 36 is a diffraction element with fine grooves formed on a glass surface so as to operate as a diffraction grating. As depicted in FIG. 21, the splitting element 36 is divided into three areas in a direction corresponding to a radial direction R of an optical disk 2, that is, a central portion area (a center portion area 36c and two end portion areas 36u and 36d) and two end portion areas 36r and 36l between which the central portion area is sandwiched. The central portion area is further divided into three areas along a tangential direction T, that is, the center portion area 36c and the upper and lower end portion areas 36u and 36d between which the center portion area 36c is sandwiched. Thus, the splitting element 36 is totally divided into five areas.

That is, the splitting element 36 is divided into three areas in the direction corresponding to the radial direction R of the optical disk 2, and has the central portion area and the two end portion areas 36r and 36l. The central portion area is divided into three areas in the direction corresponding to the tangential direction T, and has the center portion area 36c and the upper and lower end portion areas 36u and 36d between which the center portion area 36c is sandwiched.

A light beam having passed through these areas is separated into light beams traveling in different directions by means of the diffraction gratings in the respective areas.

Since the splitting element 36 is a five-piece element, the photodetector 37 also includes live light receiving sections 37r, 37d, 37c, 37u, and 37l, and the gain controller 38 also controls five types of amplifiers 38r, 38d, 38c, 38u, and 38l to provide gains Kr, Kd, Kc, Ku, and Kl to the amplifiers 38r, 38d, 38c, 38u, and 38l, respectively. Furthermore, the adder 39 adds together light amount signals resulting from the amplification by the optimum gains Kr, Kd, Kc, Ku, and Kl and outputs the information signal to a reproduction signal processing section 10.

As described above, the photodetector 37 has the light receiving section 37c that receives a light beam from the center portion area 36c and the four light receiving sections 37r, 37d, 37u, and 37l that receive light beams from the four end portion areas 36r, 36d, 36u, and 36l, respectively. The photodetector 37 outputs light amount signals corresponding to the amounts of light in the received light beams. The amplifier 38c receives the light amount signal from the light receiving section 37c and amplifies the light amount signal by the gain Kc to output a central portion amplified signal. The amplifiers 38r and 38l receive the light amount signals from the light receiving sections 37r and 38l and amplify the light amount signals by the gains Kr and Kl, respectively, to output end portion amplified signals. The amplifiers 38d and 38u receive the light amount signals from the light receiving sections 37d and 37u and amplify the light amount signals by the gains Kd and Ku, respectively, to output central portion amplified signals.

The adder 39 adds the amplified signals from the amplifiers 38r, 38d, 38c, 38u, and 38l together and outputs an information signal. When the polarity of a tracking control signal is inverted, the gain controller 38 switches the gains Kr, Kd, Kc, Ku, and Kl of the amplifiers 38r, 38d, 38c, 38u, and 38l, and sets the gain Kc of the amplifier 38c substantially lower than the gain of at least one of the gains Kr, Kd, Ku, and Kl of the amplifiers 38r, 38d, 38u, and 38l so as to reduce crosstalk from the adjacent tracks in the optical disk 2.

As described above, in Embodiment 4, the splitting element 36 is divided into five areas in a pattern as depicted in FIG. 16, and thus, correction of crosstalk is performed only on an area in which crosstalk from the adjacent tracks concentrates. This allows crosstalk from the adjacent tracks to be more minutely corrected.

Thus, not only effects similar to the effects of the optical disk information device in FIG. 1 can be exerted but also the information signal output by the adder 39 contains more minutely suppressed crosstalk and involves a more significantly reduced error rate. The reproduction signal processing section 10 can thus reproduce a more accurate reproduction signal RF.

Embodiment 5

Figure 22:
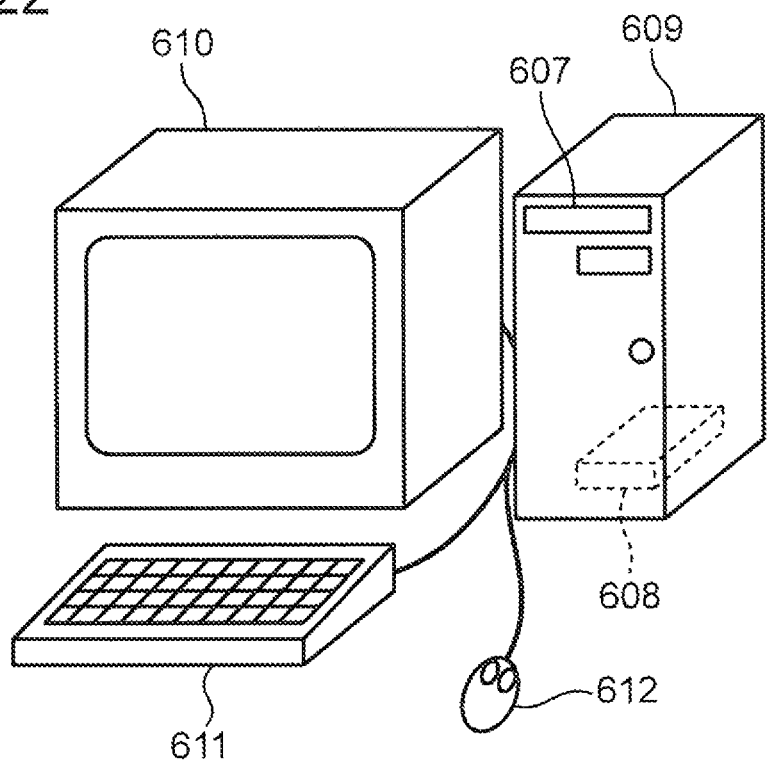
FIG. 22 is a perspective view of a computer according to Embodiment 5 of the present invention.

Embodiment 5 is an embodiment of a computer device that is an example of an information processing device including an optical disk information device 607 according to one of the above-described embodiments. FIG. 22 is a perspective view of a computer according to Embodiment 5.

A computer 609 depicted in FIG. 22 includes the optical disk information device 607 according to one of the above-described embodiments, input devices such as a keyboard 611 and a mouse 612 via which information is input, a calculation device 608 such as a CPU (Central Processing Unit) which executes calculations based on information input via the input devices or information read from the optical disk information device 607, and an output device 610 such as a cathode-ray tube or a liquid crystal display device which displays information on the results of calculations executed by the calculation device 608. The calculation device 608 functions as an information processing section that processes information to be recorded in the optical disk information device 607 and/or information reproduced from the optical disk information device 607.

The computer 609 according to Embodiment 5 includes the optical disk information device 607 according to one of the above-described embodiments. The computer 609 can reduce crosstalk using a system that provides practical tracking error signals, increasing the recording density in the track direction. The computer 609 thus enables stable, dense recording and reproduction and a reduction in costs and can be used for various applications.

Furthermore, the computer 609 may include wired or wireless I/O terminals through which information to be recorded in the optical disk information device 607 is retrieved or information read by the optical disk information device 607 is output to the outside. The computer 609 can thus exchange information with a network, that is, a plurality of devices, for example, a computer, a telephone, and a television tuner so as to be utilized by the plurality of devices as a shared information server (optical disk server). In this case, the computer 609 can perform recording or reproduction on different types of optical disks and can thus be used for a wide range of applications.

Moreover, when including a changer that allows a plurality of disks to be inserted into and removed out of the optical disk information device 607, the computer 609 is effective for allowing much information to be recorded and accumulated.

Embodiment 6

Figure 23:
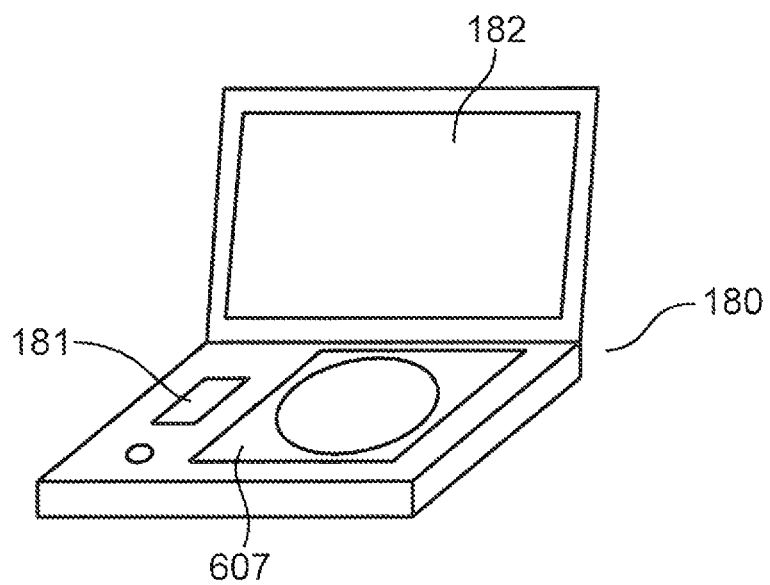
FIG. 23 is a perspective view of an optical disk player according to Embodiment 6 of the present invention.

Embodiment 6 is an embodiment of an optical disk player that is an example of an information processing device including an optical disk information device 607 according to one of the above-described embodiments. FIG. 23 is a perspective view of the optical disk player according to Embodiment 6.

An optical disk player 180 depicted in FIG. 23 includes the optical disk information device 607 according to one of the above-described embodiments and a conversion device that converts information, that is, information signals obtained from the optical disk information device 607 into images, for example, a decoder 181. The decoder 181 functions as an information processing section that processes information to be recorded in the optical disk information device 607 and/or information reproduced from the optical disk information device 607. Furthermore, this configuration may be utilized as a car navigation system. Additionally, the configuration may include a display device 182 such as a liquid crystal monitor.

The optical disk player 180 according to Embodiment 6 includes the optical disk information device 607 according to one of the above-described embodiments. The optical disk player 180 can reduce crosstalk using a system that provides practical tracking error signals, increasing the recording density in the track direction. The optical disk player 180 thus enables stable, dense recording and reproduction and a reduction in costs and can be used for various applications.

Embodiment 7

Figure 24:
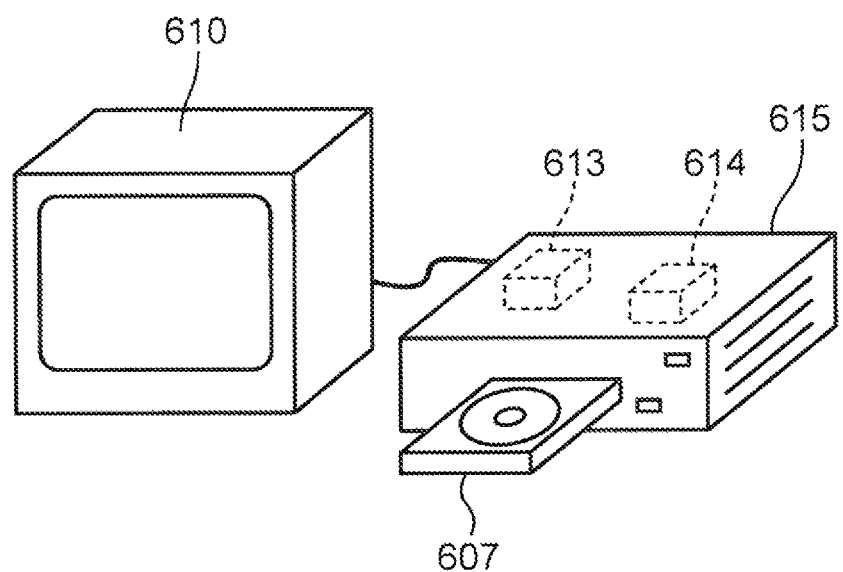
FIG. 24 is a perspective of an optical disk recorder according to Embodiment 7 of the present invention.

Embodiment 7 is an embodiment of an optical disk recorder that is an example of an information processing device including an optical disk information device 607 according to one of the above-described embodiments. FIG. 24 is a perspective view of the optical disk recorder according to Embodiment 7.

An optical disk recorder 615 depicted in FIG. 24 includes the optical disk information device 607 according to one of the above-described embodiments and a recording signal processing circuit 613 that converts image signals into information signals to be recorded in an optical disk by the optical disk information device 607.

The optical disk recorder 615 preferably also has a reproduction signal processing circuit 614 that converts information signals obtained from the optical disk information device 607 into image signals. This configuration enables already recorded signals to be reproduced. Moreover, the optical disk recorder 615 may also include an output device 610 such as a cathode-ray tube or a liquid crystal display device which displays information.

In Embodiment 7, the recording signal processing circuit 613 and/or the reproduction signal processing circuit 614 functions as an information processing section that processes information to be recorded in the optical disk information device 607 and/or information reproduced from the optical disk information device 607.

The optical disk recorder 615 according to Embodiment 7 includes the optical disk information device 607 according to one of the above-described embodiments. The optical disk recorder 615 can reduce crosstalk using a system that provides practical tracking error signals, increasing the recording density in the track direction. The optical disk recorder 615 thus enables stable, dense recording and reproduction and a reduction in costs and can be used for various applications.

Each aspect of the present invention will be described below based on the above-described embodiments. That is, an aspect of the present invention provides an optical disk information device that reproduces and/or records information from and/or on an optical disk having groove-shaped tracks and allowing information to be recorded on land portions and groove portions of the grooves, the optical disk information device having a laser light source that emits a luminous flux with a wavelength $\lambda$, an objective lens having a numerical aperture NA and condensing the luminous flux emitted by the laser light source to form a condensing spot on the optical disk, a splitting element having a central portion area and at least two end portion areas between which the central portion area is sandwiched to split reflected light that is reflected and diffracted by the optical disk into a luminous flux corresponding to the central portion area and luminous fluxes corresponding to the end portion areas, a photodetector having a central portion light receiving section that receives the luminous flux from the central portion area and at least two end portion light receiving sections that receive the luminous fluxes from the end portion areas, to output light amount signals corresponding to amounts of light in the received luminous fluxes, a central portion amplifier that receives the light amount signal from the central portion light receiving section and amplifies the light amount signal by a predetermined gain to output a central portion amplified signal, at least two end portion amplifiers that receive the light amount signals from the end portion light receiving sections and amplify the light amount signals by a predetermined gain to output end portion amplified signals, a gain controller that controls the gains of the central portion amplifier and the end portion amplifiers, an adder that adds the central portion amplified signal from the central portion amplifier and the end portion amplified signals from the end portion amplifiers together and outputs an information signal, a reproduction signal processing section that processes the information signal and outputs a reproduction signal, and a control signal processing section that receives the reflected light that is reflected and diffracted by the optical disk to produce a focusing control signal and a tracking control signal, wherein the control signal processing section includes a tracking switcher that inverts a polarity of the tracking control signal depending on whether a track scanned by the condensing spot corresponds to the land portion or the groove portion, the gain controller switches the gains of the central portion amplifier and the end portion amplifiers when the polarity of the tracking control signal is inverted and sets the gain of the central portion amplifier substantially lower than the gain of at least one of the end portion amplifiers so as to reduce crosstalk from adjacent tracks in the optical disk, and when a groove pitch in the optical disk is denoted by Gp, $(Gp/2)<(1.2\cdot\lambda)/(2\cdot NA)$ is satisfied.

According to the optical disk information device, light is reflected and diffracted into reflected light by the optical disk having the groove-shaped tracks with the groove pitch Gp satisfying $(Gp/2)<(1.2\cdot\lambda)/(2\cdot NA)$ and allowing information to be recorded on the land portions and groove portions of the grooves. The splitting element splits the reflected light into the luminous flux corresponding to the central portion area and the luminous fluxes corresponding to at least two end portion areas between which the central portion area is sandwiched. The photodetector receives the luminous fluxes and outputs light amount signals. The light amount signals are amplified by the predetermined gains to obtain the central portion amplified signal and the end portion amplified signals. The central portion amplified signal and the end portion amplified signals are added together. The added amplified signals are output as an information signal. At this time, depending on whether the track scanned by the condensing spot corresponds to the land portion or groove portion in the optical disk, the polarity of the tracking control signal is inverted. At the same time, the gains provided for the light amount signals associated with the respective luminous fluxes are switched.

In this regard, since the optical disk used allows information to be recorded on the land portions and groove portions of the grooves, the track pitch Tp can be set to half of the groove pitch Gp. Thus, even when the track pitch Tp is set smaller than the diffraction limit for light beams, sufficient tracking error signals can be obtained.

Furthermore, since the land portion and the groove portion differ in reflectance and in the phase of a light beam of reflected light, the relation between the scanned track and the adjacent tracks is inverted depending on whether the scanned track corresponds to the land portion or the groove portion. The inversion disables the effects of the crosstalk canceller. However, obtaining timing for switching of the polarity of the tracking control signal enables switching of the combination of the gains of the central portion amplifier and the end portion amplifiers set by the gain controller.

Thus, stable tracking control can be performed on higher-density optical disks with a small track pitch Tp equal to or smaller than the diffraction limit for light beams. Furthermore, leakage of signals from the adjacent track into the scanned track can be suppressed with the error rate reduced. This allows accurate recording and reproduction of information signals to be achieved.

As a result, an optical disk information device can be achieved which can reduce crosstalk using the system that provides practical tracking error signals, increasing the recording density in the track direction.

Preferably, the splitting element is divided into three areas in the direction corresponding to the radial direction of the optical disk and has the central portion area and the two end portion areas.

In this case, crosstalk from the adjacent tracks can be suppressed to reduce the error rate, allowing accurate reproduction signals to be reproduced.

The splitting element is divided into seven areas in the direction corresponding to the radial direction of the optical disk and has a first central portion area positioned in the center of the splitting element, two first end portion areas between which the first central portion area is sandwiched, two second central portion areas between which the two first end portion areas are sandwiched, and two second end portion areas between which the two second central portion areas are sandwiched. The central portion light receiving section receives three luminous fluxes from the first central portion area and the second central portion areas, and outputs light amount signals corresponding to amounts of light in the three received luminous fluxes. One of the end portion light receiving sections receives two luminous fluxes from one of the two sets of the first end portion areas and the second end portion areas, and outputs light amount signals corresponding to amounts of light in the two received luminous fluxes. The other of the end portion light receiving sections receives two luminous fluxes from the other of the two sets of the first end portion areas and the second end portion areas, and outputs light amount signals corresponding to amounts of light in the two received luminous fluxes.

In this case, the splitting element is divided into seven areas in the above-described pattern. Thus, crosstalk from the adjacent tracks can be more minutely corrected.

The splitting element may be divided into three areas in the direction corresponding to the radial direction of the optical disk, and has a generally cross-shaped central portion area positioned in the center of the splitting element and generally C-shaped two end portion areas between which the central portion area is sandwiched.

In this case, the splitting element is divided into three areas in the above-described pattern to allow correction of crosstalk to be performed depending on an area in which crosstalk from the adjacent tracks concentrates. Thus, crosstalk from the adjacent tracks can be more minutely corrected.

The splitting element may be divided into three areas in the direction corresponding to the radial direction of the optical disk, and has a generally cross-shaped central portion area positioned in the center of the splitting element and generally C-shaped two end portion areas between which the central portion area is sandwiched.

In this case, the splitting element is divided into three areas in the above-described pattern to allow correction of crosstalk to be performed depending on the area in which crosstalk from the adjacent tracks concentrates. Thus, crosstalk from the adjacent tracks can be more minutely corrected.

The splitting element may be divided into three areas in the direction corresponding to the radial direction of the optical disk and have the central portion area and the two end portion areas. The central portion area may be divided into three areas in a direction corresponding to a tangential direction of the optical disk, and have a center portion area and two central end portion areas between which the center portion area is sandwiched. The photodetector may have a center portion light receiving section that receives a luminous flux from the center portion area, two central end portion light receiving sections that receive luminous fluxes from the two central end portion areas, and two end portion light receiving sections that receive luminous fluxes from the two end portion areas, and output light amount signals corresponding to amounts of light in the received luminous fluxes. The central portion amplifier may receive the light amount signal from the center portion light receiving section and amplify the light amount signal by a predetermined gain to output a central portion amplified signal. The end portion amplifiers may include two first end portion amplifiers that receive the light amount signals from the two end portion light receiving section and amplify the light amount signals by a predetermined gain to output end portion amplified signals and two second end portion amplifiers that receive the light amount signals from the two central end portion light receiving sections and amplify the light amount signals by a predetermined gain to output central end portion amplified signals. The adder may add together the amplified signals from the central portion amplifier, the first end portion amplifiers, and the second end portion amplifiers, and output an information signal. When the polarity of the tracking control signal is inverted, the gain controller may switch the gains of the central portion amplifier, the first end portion amplifiers, and the second end portion amplifiers and set the gain of the central portion amplifier substantially lower than the gain of at least one of the first and second end portion amplifiers so as to reduce crosstalk from the adjacent tracks in the optical disk.

In this case, the splitting element is divided into five areas in the above-described pattern to allow correction of crosstalk to be performed only on the area in which crosstalk from the adjacent tracks concentrates. Thus, crosstalk from the adjacent tracks can be more minutely corrected.

Preferably, the width of the central portion area of the splitting element in the direction corresponding to the radial direction of the optical disk is 35% or more of the width of a luminous flux.

In this case, crosstalk from the adjacent tracks in the optical disk can be sufficiently reduced, and the quality of reproduction signals can be increased to a sufficiently high level.

Preferably, the gain controller sets different gains for the central portion amplifier and the end portion amplifiers depending on whether the track scanned by the condensing spot corresponds to the land portion or the groove portion.

In this case, the combination of the gain of the central portion amplifier and the gains of the end portion amplifiers can be switched in conjunction with the switching between the land portion and the groove portion. Thus, crosstalk from the adjacent tracks is reduced in accordance with the optical characteristics of the land portion and the groove portion to decrease the error rate. As a result, accurate reproduction signals can be reproduced.

Preferably, the gain controller prestores a land portion gain initial value and a groove portion gain initial value which are different from each other. When the polarity of the tracking control signal is inverted, the gain controller sets the land portion gain initial value for the central portion amplifier and the and portion amplifiers when the track scanned by the condensing spot is the land portion, and sets the groove portion gain initial value for the central portion amplifier and the end portion amplifiers when the track scanned by the condensing spot is the groove portion.

In this case, the land portion gain initial values and the groove portion gain initial values can be set in accordance with the optical characteristics of the land portion and the groove portion. Thus, crosstalk from the adjacent tracks is reduced in a short time to decrease the error rate. As a result, accurate reproduction signals can be instantaneously obtained.

Preferably, the gain controller sets different gains for the central portion amplifier and the end portion amplifiers in accordance with a track pitch of the optical disk.

In this case, the combination of the gain of the central portion amplifier and the gains of the end portion amplifiers is switched in accordance with the track pitch of the optical disk. Thus, even when an optical disk with a different groove pitch is used, crosstalk from the adjacent tracks is reduced to decrease the error rate. As a result, accurate reproduction signals can be reproduced.

Preferably, the reproduction signal processing section generates an evaluation value for the reproduction signal, and the gain controller sets the gains of the central portion amplifier and the end portion amplifiers in accordance with the evaluation value for the reproduction signal.

In this case, the gains of the central portion amplifier and the end portion amplifiers can be set in accordance with the evaluation value for the reproduction signal. Thus, crosstalk from the adjacent tracks is reduced to decrease the error rate, allowing accurate reproduction signals to be reproduced.

Preferably, the optical disk information device further includes a tilt detector that detects a tilt amount of the optical disk in the radial direction, and the gain controller sets the gains of the central portion amplifier and the end portion amplifiers in accordance with the tilt amount detected by the tilt detector.

In this case, the gains of the central portion amplifier and the end portion amplifiers can be set in accordance with the tilt amount of the optical disk in the radial direction. Thus, even when the optical disk is tilted, crosstalk from the adjacent tracks is reduced to decrease the error rate. As a result, accurate reproduction signals can be reproduced.

Preferably, the control signal processing section detects an off-track amount of the condensing spot with respect to a track in the optical disk, and the gain controller sets the gains of the central portion amplifier and the end portion amplifiers in accordance with the off-track amount.

In this case, the gains of the central portion amplifier and the end portion amplifiers can be set in accordance with the off-track amount of the condensing spot. Thus, even when a condensing spot off-track phenomenon occurs, crosstalk from the adjacent tracks is reduced to decrease the error rate. As a result, accurate reproduction signals can be reproduced.

Preferably, the optical disk information device further includes a lens shift detector that detects a lens shift amount of the objective lens with respect to the track in the optical disk, and the gain controller sets the gains of the central portion amplifier and the end portion amplifiers in accordance with the lens shift amount detected by the lens shift detector.

In this case, the gains of the central portion amplifier and the end portion amplifiers can be set in accordance with the lens shift amount of the objective lens. Thus, even when a lens shift of the objective lens occurs, crosstalk from the adjacent tracks is reduced to decrease the error rate. As a result, accurate reproduction signals can be reproduced.

An information processing device according to another aspect of the present invention includes one of the above-described optical disk information device and an information processing section that processes information to be recorded in the optical disk information device and/or information reproduced from the optical disk information device.

The information processing device can reduce crosstalk using a system that provides practical tracking error signals, thus increasing the recording density in the track direction. The information processing device thus enables stable, dense recording and reproduction and can be used for a wide range of applications.

INDUSTRIAL APPLICABILITY

The optical disk information device according to the present invention enables recording and reproduction to be stably performed on an optical disk with a reduced track pitch and an increased density.

Hence, the present invention can be utilized for information processing devices such as a computer, a server, an optical disk player, and an optical disk recorder which have a high-capacity optical disk information device and which are applied equipment of the optical disk information device according to the present invention.

The invention claimed is:

1. An optical disk information device that performs at least one of reproducing information from an optical disk or recording information to the optical disk, the optical disk having groove-shaped tracks and allowing information to be recorded on land portions and groove portions of the grooves, the optical disk information device comprising:

a laser light source that emits a luminous flux with a wavelength λ;

an objective lens having a numerical aperture NA and condensing the luminous flux emitted by the laser light source to form a condensing spot on the optical disk;

a splitting element having a central portion area and at least two end portion areas between which the central portion area is sandwiched to split reflected light that is reflected and diffracted by the optical disk into a luminous flux corresponding to the central portion area and luminous fluxes corresponding to the end portion areas;

a photodetector having a central portion light receiving section that receives the luminous flux from the central portion area and at least two end portion light receiving sections that receive the luminous fluxes from the end portion areas, to output light amount signals corresponding to amounts of light in the received luminous fluxes;

a central portion amplifier that receives the light amount signal from the central portion light receiving section and amplifies the light amount signal by a predetermined gain to output a central portion amplified signal;

at least two end portion amplifiers that receive the light amount signals from the end portion light receiving sections and amplify the light amount signals by a predetermined gain to output end portion amplified signals;

a gain controller that controls the gains of the central portion amplifier and the end portion amplifiers;

an adder that adds the central portion amplified signal from the central portion amplifier and the end portion amplified signals from the end portion amplifiers together and outputs an information signal;

a reproduction signal processing section that processes the information signal and outputs a reproduction signal; and a control signal processing section that receives the reflected light that is reflected and diffracted by the optical disk to produce a focusing control signal and a tracking control signal, wherein the control signal processing section includes a tracking switcher that inverts a polarity of the tracking control signal depending on whether a track scanned by the condensing spot corresponds to the land portion or the groove portion, when the polarity of the tracking control signal is inverted, the gain controller switches the gains of the central portion amplifier and the end portion amplifiers and sets the gain of the central portion amplifier substantially lower than the gain of at least one of the end portion amplifiers so as to reduce crosstalk from adjacent tracks in the optical disk, a groove pitch in the optical disk is denoted by Gp, and (Gp/2)<(1.2•λ)/(2•NA), the splitting element is divided into three areas in a direction corresponding to a radial direction of the optical disk and includes the central portion area and the two end portion areas, the central portion area is divided into three areas in a direction corresponding to a tangential direction of the optical disk, and includes a center portion area and two central end portion areas between which the center portion area is sandwiched, the photodetector includes a center portion light receiving section that receives a luminous flux from the center portion area, two central end portion light receiving sections that receive luminous fluxes from the two central end portion areas, and two end portion light receiving sections that receive luminous fluxes from the two end portion areas, and outputs light amount signals corresponding to amounts of light in the received luminous fluxes, the central portion amplifier receives the light amount signal from the center portion light receiving section and amplifies the light amount signal by a predetermined gain to output a central portion amplified signal, the end portion amplifiers include:
two first end portion amplifiers that receive the light amount signals from the two end portion light receiving sections and amplify the light amount signals by a predetermined gain to output end portion amplified signals; and two second end portion amplifiers that receive the light amount signals from the two central end portion light receiving sections and amplify the light amount signals by a predetermined gain to output central end portion amplified signals, the adder adds together the amplified signals from the central portion amplifier, the first end portion amplifiers, and the second end portion amplifiers, and outputs an information signal, and when the polarity of the tracking control signal is inverted, the gain controller switches the gains of the central portion amplifier, the first end portion amplifiers, and the second end portion amplifiers and sets the gain of the central portion amplifier substantially lower than the gain of at least one of the first and second end portion amplifiers so as to reduce crosstalk from the adjacent tracks in the optical disk.

2. The optical disk information device according to claim 1, wherein a width of the central portion area of the splitting element in a direction corresponding to a radial direction of the optical disk is 35% or more of a width of a luminous flux.

3. The optical disk information device according to claim 1, wherein the gain controller sets different gains for the central portion amplifier and the end portion amplifiers depending on whether the track scanned by the condensing spot corresponds to the land portion or the groove portion.

4. The optical disk information device according to claim 1, wherein the gain controller prestores a land portion gain initial value and a groove portion gain initial value which are different from each other, and when the polarity of the tracking control signal is inverted, the gain controller sets the land portion gain initial value for the central portion amplifier and the end portion amplifiers when the track scanned by the condensing spot is the land portion, and sets the groove portion gain initial value for the central portion amplifier and the end portion amplifiers when the track scanned by the condensing spot is the groove portion.

5. The optical disk information device according to claim 1, wherein the gain controller sets different gains for the central portion amplifier and the end portion amplifiers in accordance with a track pitch of the optical disk.

6. The optical disk information device according to claim 1, wherein the reproduction signal processing section generates an evaluation value for the reproduction signal, and the gain controller sets the gains of the central portion amplifier and the end portion amplifiers in accordance with the evaluation value for the reproduction signal.

7. The optical disk information device according to claim 1, further comprising a tilt detector that detects a tilt amount of the optical disk in a radial direction,
wherein the gain controller sets the gains of the central portion amplifier and the end portion amplifiers in accordance with the tilt amount detected by the tilt detector.

8. The optical disk information device according to claim 1, wherein the control signal processing section detects an off-track amount of the condensing spot with respect to a track in the optical disk, and
the gain controller sets the gains of the central portion amplifier and the end portion amplifiers in accordance with the off-track amount.

9. The optical disk information device according to claim 1, further comprising a lens shift detector that detects a lens shift amount of the objective lens with respect to the track in the optical disk,
 wherein the gain controller sets the gains of the central portion amplifier and the end portion amplifiers in accordance with the lens shift amount detected by the lens shift detector.

10. An information processing device comprising:
 the optical disk information device according to claim 1; and
 an information processing section that processes at least one of information to be recorded in the optical disk information device or information reproduced from the optical disk information device.

* * * * *